(12) United States Patent
Patel et al.

(10) Patent No.: US 11,211,054 B2
(45) Date of Patent: *Dec. 28, 2021

(54) MONITORING OF ONE OR MORE AUDIO/VIDEO COLLECTION DEVICES

(71) Applicant: Comcast Cable Communications, LLC, Philadelphia, PA (US)

(72) Inventors: Mehul Patel, Centennial, CO (US); David Eng, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/986,945

(22) Filed: Aug. 6, 2020

(65) Prior Publication Data
US 2021/0193122 A1 Jun. 24, 2021

Related U.S. Application Data

(63) Continuation of application No. 16/146,619, filed on Sep. 28, 2018, now Pat. No. 10,762,893.

(51) Int. Cl.
*G10L 15/08* (2006.01)
*G10L 15/07* (2013.01)
(Continued)

(52) U.S. Cl.
CPC .............. *G10L 15/08* (2013.01); *G10L 15/07* (2013.01); *G10L 17/22* (2013.01); *H04W 12/06* (2013.01);
(Continued)

(58) Field of Classification Search
CPC ......... G10L 15/08; G10L 15/07; G10L 17/22; G10L 2015/088; G10L 15/22;
(Continued)

(56) References Cited

U.S. PATENT DOCUMENTS 8,837,713 B2 9/2014 Patil
8,849,652 B2 * 9/2014 Weider .................... G10L 15/22
704/9

(Continued)

FOREIGN PATENT DOCUMENTS

AU 2017100890 B4 3/2018
EP 1933499 A1 * 6/2008 .......... H04L 41/082
(Continued)

OTHER PUBLICATIONS

Jason Fitzpatrick, "How to Stop your Amazon Echo from Listening In" as shown on HowtoGeek.com on Jan. 2, 2016. Retrieved from: https://www.howtogeek.com/237397/how-to-stop-your-amazon-echo-from-listening-in/.

(Continued)

*Primary Examiner* — Mohammad K Islam

(74) *Attorney, Agent, or Firm* — Banner & Witcoff, Ltd.

(57) ABSTRACT

Methods, systems and apparatuses are described for monitoring of one or more A/V collection devices within a premises. Based on the monitoring, one or more computing devices may determine whether to route or block a data transmission outside a premises. The data transmission may be routed or blocked based on, for example, one or more of the following: whether a transmission window associated with an A/V collection device is open or closed; whether the data transmission is being sent to an authorized destination device; whether the data transmission is encrypted, and the like.

30 Claims, 15 Drawing Sheets

(51) Int. Cl.
*G10L 17/22* (2013.01)
*H04W 12/06* (2021.01)
*H04W 12/08* (2021.01)

(52) U.S. Cl.
CPC ....... *H04W 12/08* (2013.01); *G10L 2015/088* (2013.01)

(58) Field of Classification Search
CPC ....... H04W 12/06; H04W 12/08; G06F 3/167; G06F 1/1605; G06F 1/1643; G06F 3/0412; H04M 1/72533; H04R 1/083; H04R 27/00; H04L 63/00
See application file for complete search history.

(56) References Cited

U.S. PATENT DOCUMENTS

| | | | | |
|---|---|---|---|---|
| 8,995,981 | B1* | 3/2015 | Aginsky | G08C 17/02 455/419 |
| 9,345,054 | B1* | 5/2016 | Lu | H04M 1/72533 |
| 9,443,527 | B1* | 9/2016 | Watanabe | G10L 15/22 |
| 9,646,628 | B1* | 5/2017 | Carlson | G10L 21/0208 |
| 9,686,241 | B1* | 6/2017 | Levin | H04W 12/08 |
| 9,990,129 | B2* | 6/2018 | Yang | G06F 3/041 |
| 10,002,259 | B1 | 6/2018 | Mai | |
| 10,063,542 | B1 | 8/2018 | Kao | |
| 10,079,015 | B1* | 9/2018 | Lockhart | G10L 15/22 |
| 10,186,266 | B1* | 1/2019 | Devaraj | G10L 15/22 |
| 10,237,237 | B2* | 3/2019 | Dawes | H04L 67/10 |
| 10,292,087 | B2* | 5/2019 | Tenny | H04B 7/15507 |
| 10,397,335 | B2* | 8/2019 | Ives-Halperin | H04W 4/021 |
| 10,410,630 | B2* | 9/2019 | Weng | G06F 21/32 |
| 10,887,734 | B2* | 1/2021 | Dar | H04L 63/102 |
| 2002/0049598 | A1* | 4/2002 | Negreiro | G06Q 50/12 704/275 |
| 2004/0210647 | A1* | 10/2004 | Jin | H04L 12/2823 709/220 |
| 2009/0313026 | A1* | 12/2009 | Coffman | H04M 3/4938 704/275 |
| 2011/0032102 | A1 | 2/2011 | Miller et al. | |
| 2012/0130513 | A1* | 5/2012 | Hao | G05B 15/02 700/90 |
| 2014/0135952 | A1* | 5/2014 | Maehara | G05B 15/02 700/90 |
| 2014/0324410 | A1* | 10/2014 | Mathews | H04L 12/283 703/22 |
| 2015/0256620 | A1* | 9/2015 | Sugano | G06F 21/6218 709/217 |
| 2016/0037346 | A1* | 2/2016 | Boettcher | H04L 63/107 455/411 |
| 2016/0286398 | A1* | 9/2016 | Abraham | H04L 63/123 |
| 2016/0344569 | A1* | 11/2016 | Chun | G06F 3/04817 |
| 2017/0032783 | A1* | 2/2017 | Lord | G10L 15/22 |
| 2017/0105095 | A1* | 4/2017 | Um | H04W 4/70 |
| 2017/0116986 | A1* | 4/2017 | Weng | G10L 15/22 |
| 2017/0206896 | A1* | 7/2017 | Ko | G10L 15/22 |
| 2017/0329572 | A1* | 11/2017 | Shah | H04N 21/40 |
| 2017/0345422 | A1 | 11/2017 | Yang | |
| 2017/0359309 | A1* | 12/2017 | Bolte | H04L 63/0218 |
| 2018/0013815 | A1* | 1/2018 | Gold | H04L 12/2816 |
| 2018/0033431 | A1* | 2/2018 | Newendorp | G10L 15/22 |
| 2018/0123905 | A1* | 5/2018 | Ansari | H04L 41/0803 |
| 2018/0151180 | A1* | 5/2018 | Yehuday | G10L 15/24 |
| 2018/0310159 | A1* | 10/2018 | Katz | H04M 3/5116 |
| 2018/0337958 | A1* | 11/2018 | Nagarkar | H04L 63/20 |
| 2018/0351711 | A1* | 12/2018 | Yoganathan | G06F 16/172 |
| 2019/0025873 | A1* | 1/2019 | Goodrich | H04L 9/3297 |
| 2019/0043510 | A1* | 2/2019 | Wang | G06F 9/445 |
| 2019/0058783 | A1* | 2/2019 | Reid | H04M 1/185 |
| 2019/0066672 | A1* | 2/2019 | Wood | G10L 15/22 |
| 2019/0068651 | A1* | 2/2019 | Briggs | H04W 12/68 |
| 2019/0089748 | A1* | 3/2019 | Manor | H04L 63/205 |
| 2019/0206396 | A1* | 7/2019 | Chen | G10L 15/30 |
| 2019/0206411 | A1* | 7/2019 | Li | G10L 15/26 |
| 2019/0206412 | A1* | 7/2019 | Li | G10L 17/00 |
| 2019/0215184 | A1* | 7/2019 | Emigh | G06N 20/00 |
| 2019/0251960 | A1* | 8/2019 | Maker | G10L 15/08 |
| 2019/0286835 | A1* | 9/2019 | Werneke | G06F 9/4881 |
| 2019/0347916 | A1* | 11/2019 | Wild | H04L 67/025 |
| 2020/0007356 | A1* | 1/2020 | Mason | H04L 12/2827 |
| 2020/0028734 | A1* | 1/2020 | Emigh | H04L 41/0668 |

FOREIGN PATENT DOCUMENTS

| | | | |
|---|---|---|---|
| EP | 1933499 A1 | 6/2008 | |
| WO | 9859282 A2 | 12/1998 | |
| WO | WO-9859282 A2 * | 12/1998 | ......... H04L 12/2805 |

OTHER PUBLICATIONS

Sharon Profis, "Amazon Echo saves all your voice data. Here's how to delete it" as shown on Cnet.com on Feb. 14, 2015. Retrieved from: https://www.cnet.com/how-to/amazon-echo-saves-all-your-voice-data-heres-how-to-delete-them/.
Dec. 18, 2019—European Extended Search Report—EP 19200214.5.
Sunny, "Project Alias—Enjoy Alexa without the constant voice monitoring" Feb. 16, 2018. Retrieved from: https://blog.banggood.com/project-alias-for-offline-alexa-privacy-63151.html.
Sep. 22, 2021—European Office Action—EP 19200214.5.

* cited by examiner

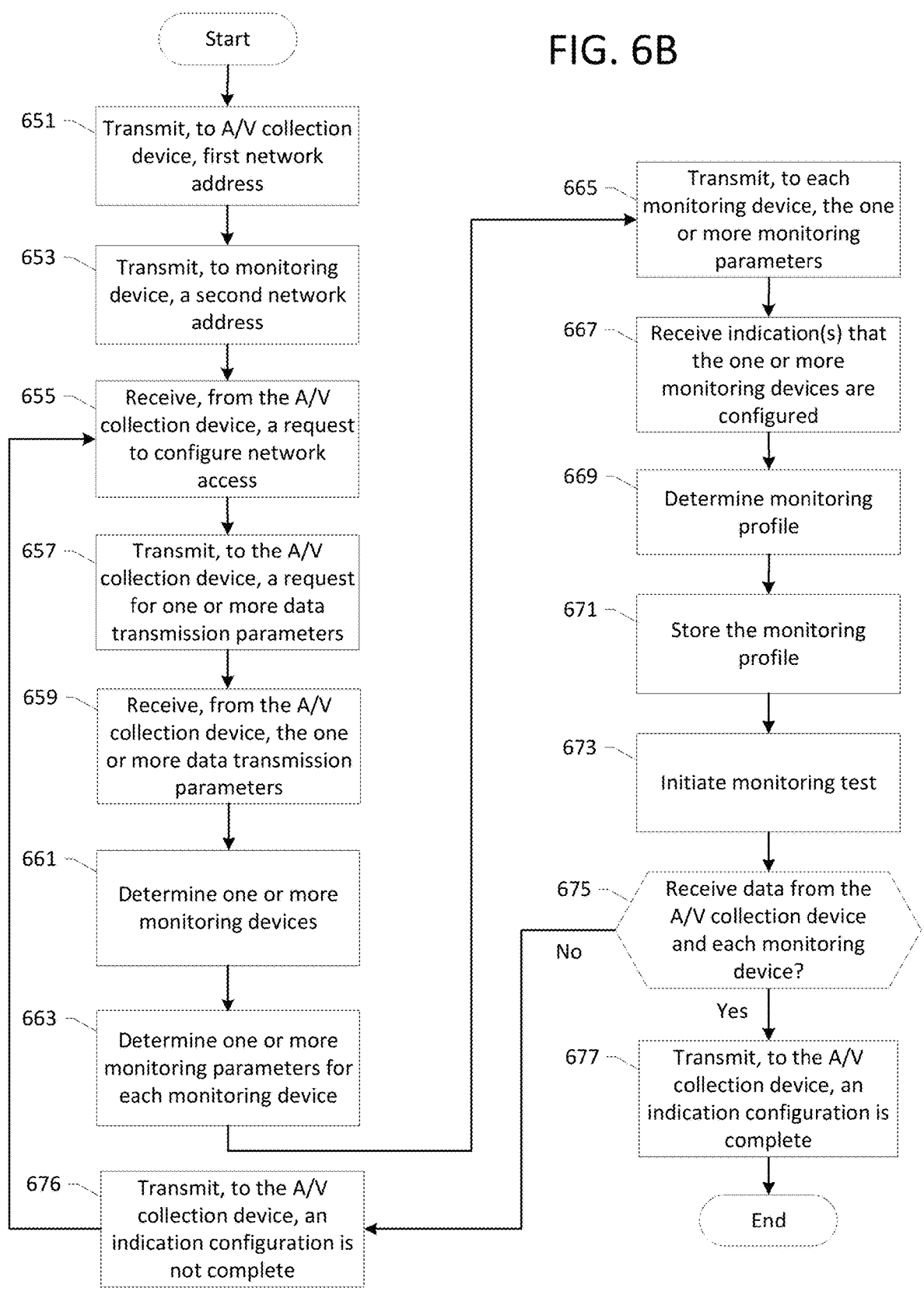

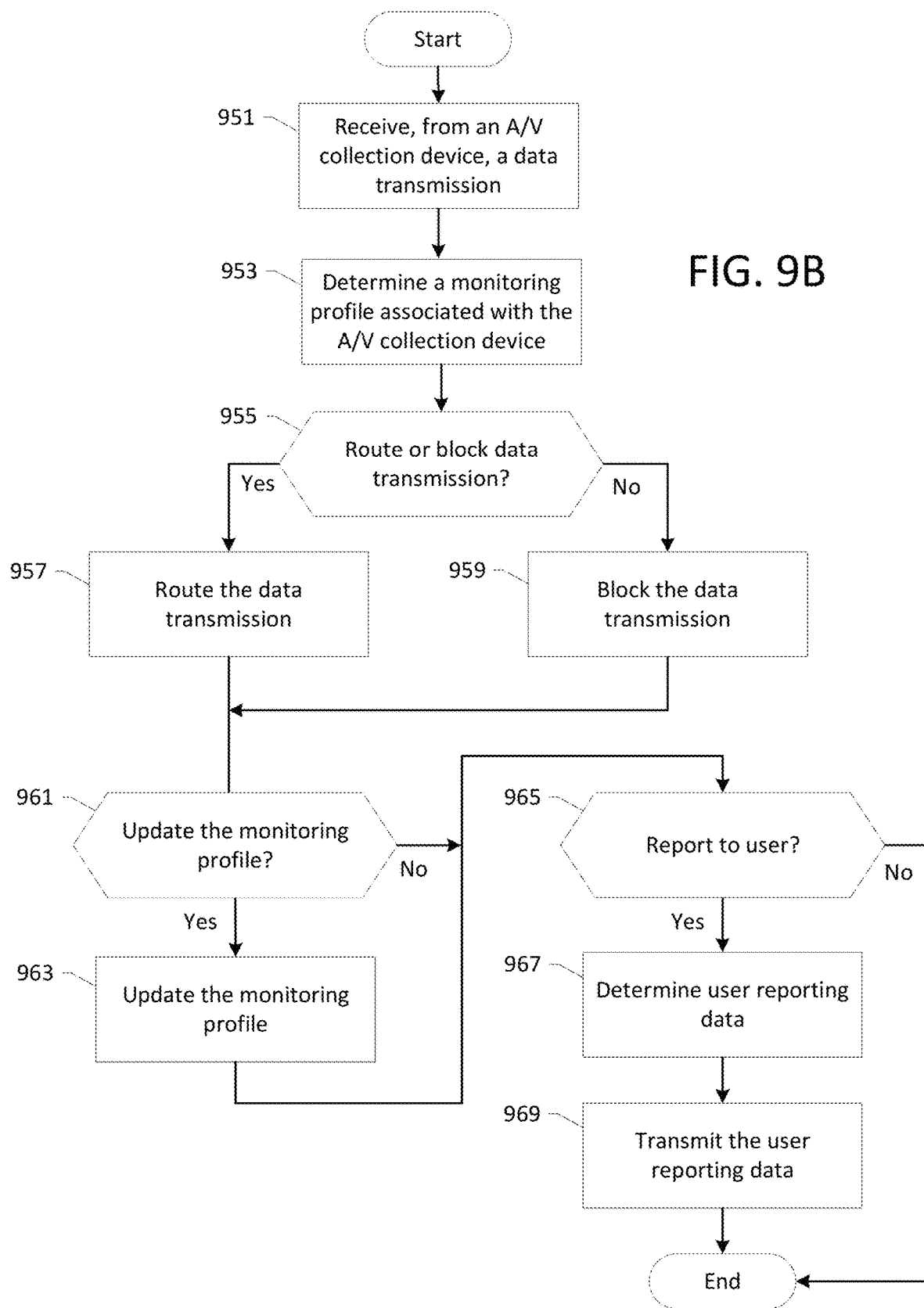

MONITORING OF ONE OR MORE AUDIO/VIDEO COLLECTION DEVICES

CROSS-REFERENCE TO RELATED APPLICATIONS

This application claims priority to and is a continuation of U.S. patent application Ser. No. 16/146,619, filed Sep. 28, 2018, the contents of which are incorporated herein by reference in its entirety.

BACKGROUND

More and more devices within a home or other type of premises are capable of communicating with other devices via a network. Some of these devices—such as the many different devices that offer the ability to respond to voice commands—may transmit data outside the home or premises. A user or entity that allows these types of devices to operate within the premises may have certain expectations about how these types of devices operate. For example, the user or entity may expect that a device is collecting and/or transmitting data at certain times but not others. The user or entity may also expect that the device is transmitting data only to certain destinations. The user or entity, however, may be unable or may find it difficult to ensure that these type of devices operate in an expected manner.

SUMMARY

The following presents a simplified summary of the present disclosure in order to provide a basic understanding of some features described herein. This summary is not an extensive overview, and is not intended to identify key or critical elements or to delineate the scope of the claims. The following summary merely presents various described features in a simplified form as a prelude to the more detailed description provided below.

Methods, systems and apparatuses are described for monitoring one or more audio/video (A/V) collection devices within a premises. The A/V collection devices may be a device that is configured to, based on a user command, transmit data outside the premises. Based on the monitoring, one or more computing devices may determine whether to route or block a data transmission outside a premises. The data transmission may be routed or blocked based on, for example, one or more of the following: whether a transmission window associated with an A/V collection device is open or closed; whether the data transmission is being sent to an authorized destination device; whether the data transmission is encrypted, and the like.

The summary here is not an exhaustive listing of the novel features described herein, and are not limiting of the claims. These and other features are described in greater detail below.

BRIEF DESCRIPTION OF THE DRAWINGS

Some features herein are shown by way of example, and not by way of limitation, in the accompanying drawings. In the drawings, like numerals reference similar elements between the drawings.

FIGS. 6A and 6B show one or more example methods that relate to a gateway device establishing monitoring of one or more A/V collection devices.

FIG. 9B shows one or more example methods that may be performed based on the gateway device receiving a data transmission from an A/V collection device.

DETAILED DESCRIPTION

In the following description, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure.

Figure 1:
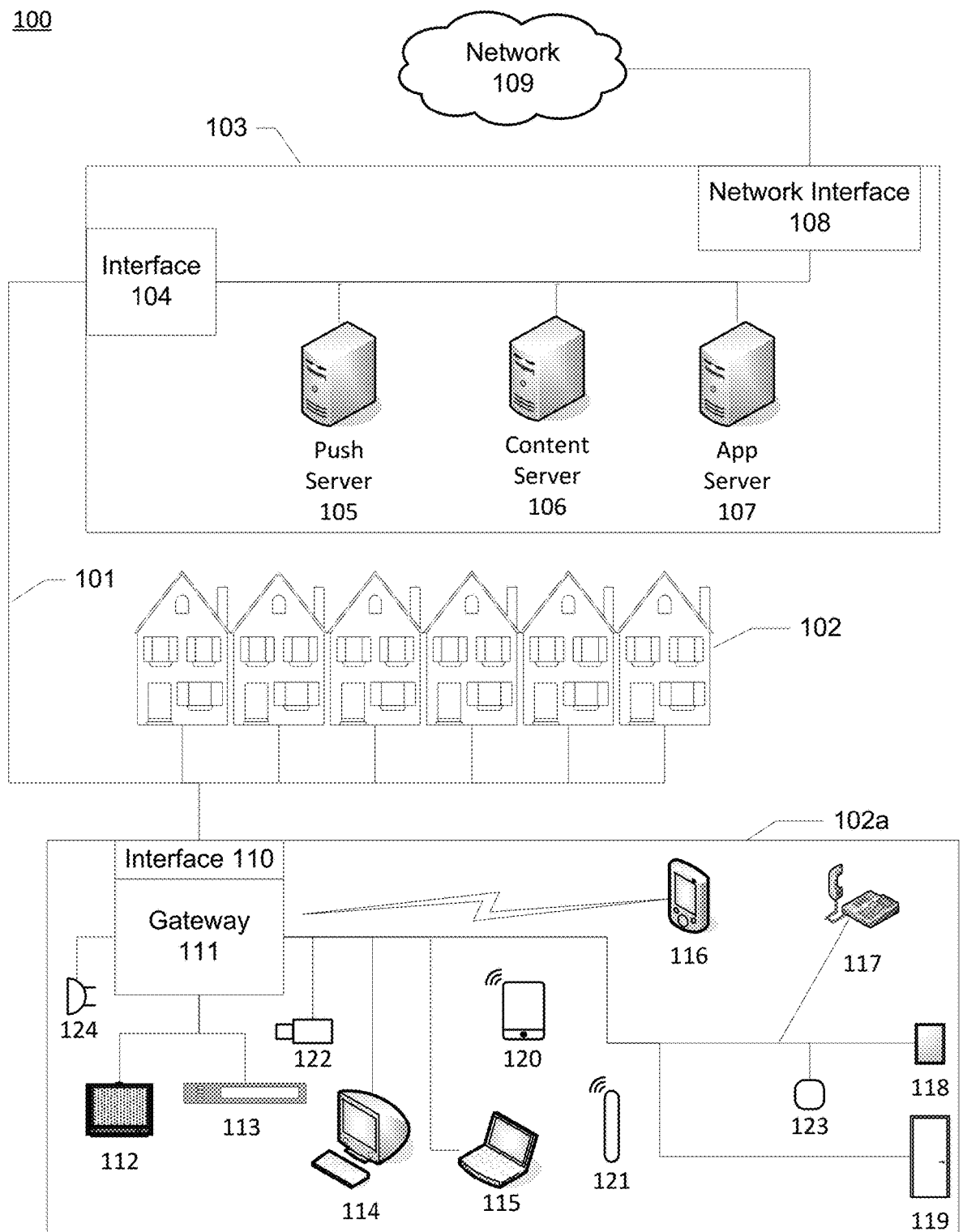
FIG. 1 shows an example information distribution network that may be used to implement one or more aspects as described herein.

FIG. 1 shows an example information distribution network 100 on which many of the various features described herein may be implemented. Network 100 may be any type of information distribution network, such as satellite, telephone, cellular, wireless, etc. For example, network 100 may be a wireless network, an optical fiber network, a coaxial cable network, or a hybrid fiber/coax (HFC) distribution network. Such networks 100 use a series of interconnected communication links 101 (e.g., coaxial cables, optical fibers, wireless, etc.) to connect multiple premises 102 (e.g., businesses, homes, consumer dwellings, etc., and/or other types of devices such as tablets, cell phones, laptops, and/or computers, etc.) to a local office 103 (e.g., a headend, a processing facility, a local exchange carrier, a gateway, a network center or other network facility, etc.). The local office 103 may transmit downstream information signals onto the links 101, and each premises 102 may have one or more receivers used to receive and process those signals.

There may be one or more links 101 originating from the local office 103, and it may be split a number of times to distribute the signal to various premises 102 in the vicinity (which may be many miles) of the local office 103. The links 101 may include components not shown in FIG. 1, such as splitters, filters, antennas, amplifiers, etc. to help convey the signal clearly. Portions of the links 101 may also be implemented with fiber-optic cable, while other portions may be implemented with coaxial cable, other lines, or wireless communication paths.

The local office 103 may include a termination system (TS) 104, such as a cable modem termination system (CMTS) in an example of an HFC-type network, which may be a computing device configured to manage communications between devices on the network of links 101 and backend devices such as servers 105-107 (to be discussed further below). In the example of an HFC-type network, the TS may be as specified in a standard, such as the Data Over Cable Service Interface Specification (DOCSIS) standard, published by Cable Television Laboratories, Inc. (a.k.a. CableLabs), or it may be a similar or modified device instead. The TS may be configured to place data on one or more downstream frequencies to be received by modems at the various premises 102, and to receive upstream communications from those modems on one or more upstream frequencies. The local office 103 may also include one or more network interfaces 108, which can permit the local office 103 to communicate with various other external networks 109. These networks 109 may include, for example, Internet Protocol (IP) networks Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to receive such notifications, including for example, a security system 419 that will be discussed in connection with FIG. 4 and/or various wired and/or wireless devices). The local office 103 may also include a content server 106. The content server 106 may be one or more computing devices that are configured to provide content to users in the homes. This content may be, for example, video on demand movies, television programs, songs, services, information, text listings, security services, etc. The content server 106 may include software to validate (or initiate the validation of) user identities and entitlements to, for example, enable access to various functions of a security monitoring service; execute the various functions of the security monitoring service; locate and retrieve (or initiate the locating and retrieval of) requested content including security footage; encrypt the content; and initiate delivery (e.g., streaming, transmitting via a series of content fragments) of the content to the requesting user and/or device.

The local office 103 may also include one or more application servers 107. An application server 107 may be a computing device configured to offer any desired service (e.g., security monitoring service or other type of service), and may run various languages and operating systems (e.g., servlets and JSP pages running on Tomcat/MySQL, OSX, BSD, Ubuntu, Red Hat Linux, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Another application server may be responsible for formatting and inserting advertisements in a video stream and/or content item being transmitted to the premises 102. Another application server may perform various security system functions including storing remotely security camera footage, storing past event history, storing security system criteria, and storing credentials to enable remote operation, control, alarm shutoff, and other security system related functions.

An example premises 102a may include an interface 110 (such as a modem, or another receiver and/or transmitter device suitable for a particular network (e.g., a wireless or wired network)), which may include transmitters and receivers used to communicate on the links 101 and with the local office 103. The interface 110 may be, for example, a coaxial cable modem (for coaxial cable lines 101), a fiber interface node (for fiber optic lines 101), a wireless transceiver, and/or any other desired modem device. The interface 110 may be connected to, or be a part of, a gateway device 111. The gateway device 111 (also referred interchangeably herein as a gateway) may be a computing device that communicates with the interface 110 to allow one or more other devices in the home and/or remote from the home to communicate with the local office 103 and other devices beyond the local office. The gateway device 111 may be a set-top box (STB), digital video recorder (DVR), computer server, security system, or any other desired computing device. The gateway 111 may also include (not shown) local network interfaces to provide communication signals to other devices in the home (e.g., user devices), such as televisions 112, additional STBs 113, personal computers 114, laptop computers 115, wireless devices 116 (wireless laptops, tablets and netbooks, mobile phones, mobile televisions, personal digital assistants (PDA), etc.), voice assistants, home assistants, smart speakers, telephones 117, window security sensors 118, tablet computers 120, personal activity sensors 121, video cameras 122, motion detectors 123, microphones 124, and/or any other desired computers, sensors, such as ambient light sensors, passive infrared sensors, humidity sensors, temperature sensors, carbon dioxide sensors, carbon monoxide sensors, and others. Additional details of the types of components that may be included in a premises, such as premises 102, will be discussed in connection with FIG. 4. Examples of the local network interfaces may include Multimedia Over Coax Alliance (MoCA) interfaces, Ethernet interfaces, universal serial bus (USB) interfaces, wireless interfaces (e.g., IEEE 802.11), Bluetooth interfaces, ZigBee interfaces and others.

Figure 2:
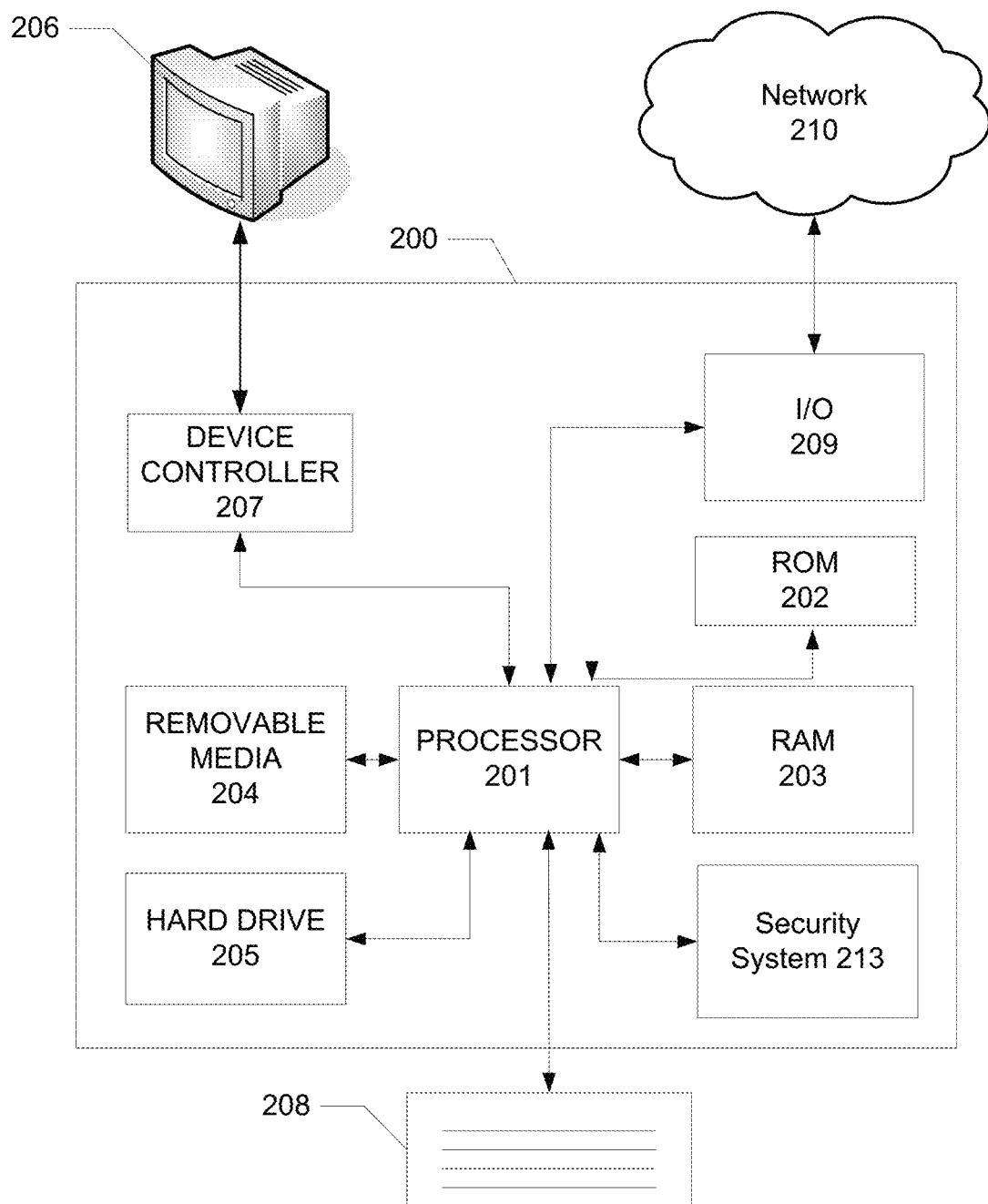
FIG. 2 shows an example computing device that may be used to implement one or more aspects as described herein.

FIG. 2 shows general hardware elements of an example computing device 200 that can be used to implement one or more aspects of the elements discussed herein and/or shown by the figures. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) storage 205 (e.g., hard drive, flash, etc.). The computing device 200 may include one or more output devices, such as a display 206 (or an external television), and may include one or more output device controllers 207, such as a video processor. There may also be one or more user input devices 208, such as a remote control, keyboard, mouse, touch screen, microphone, camera, etc. The interface between the computing device 200 and the user input devices 208 may be a wired interface, wireless interface, or a combination of the two, including IrDA interfaces, Bluetooth interfaces and ZigBee interfaces, for example. The computing device 200 may also include one or more network interfaces, such as input/output circuits 209 (such as a network card) to communicate with an external network 210. The network interface may be a wired interface, wireless interface, or a combination of the two.

The interface 209 may include a modem (e.g., a cable modem), and the network 210 may include the communication links 101 discussed above, the external network 109, an in-home network, a provider's wireless, coaxial, fiber, or hybrid fiber/coaxial distribution system (e.g., a DOCSIS network), or any other desired network. The device may include a security system 213, any associated application and/or any associated interface which may enable the device to communicate with the other components of a security monitoring system.

The FIG. 2 example is an example hardware configuration. Modifications may be made to add, remove, combine, divide, etc. components as desired. The components shown in FIG. 2 may be implemented using basic computing devices and components, and the same components (e.g., processor 201, storage 202, user interface 205, etc.) may be used to implement any of the other computing devices and components described herein. For example, the various components herein may be implemented using computing devices having components such as a processor executing computer-executable instructions stored on a computer-readable medium, as shown in FIG. 2.

One or more aspects, or features, of the disclosure may be embodied in computer-usable data and/or computer-executable instructions, such as in one or more program modules, executed by one or more computers (such as computing device 200) or other devices to perform any of the functions described herein. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. In addition, the functionality may be embodied in whole or in part in firmware or hardware equivalents such as integrated circuits, field programmable gate arrays (FPGA), and the like.

Figure 3:
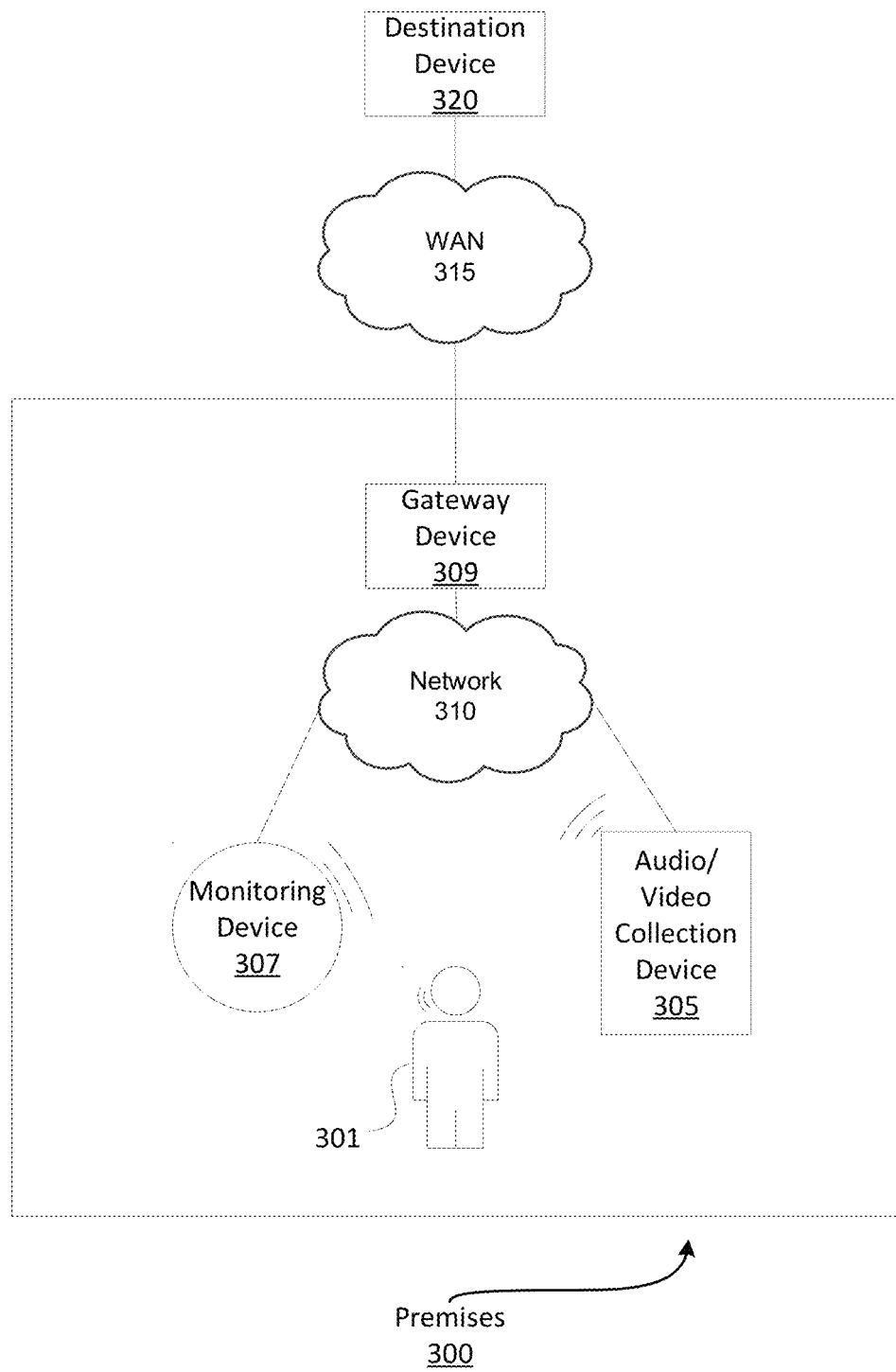
FIGS. 3 and 4 show one or more example operating environments in which one or more of the various features described herein may be implemented.

FIG. 3 shows an example operating environment in which one or more of the various features described herein may be implemented. In particular, FIG. 3 shows, in part, a number of devices that are within a premises 300 and that communicate via network 310. An A/V collection device 305, a monitoring device 307, and a gateway device 309 are shown by FIG. 3 within the premises 300. The gateway device 309 may allow one or more other devices in the premises 300, such as the A/V collection device 305, to communicate with devices outside of the premises 300. The network 310 may represent one of the networks associated with premises 300, such as an IP network (wired or wireless), a Zigbee network, and the like. The A/V collection device 305 may communicate with the gateway 309 based on a first communication technology (e.g., by transmitting packets via an IP network), and the monitoring device 307 may communicate with the gateway 309 based on a second communication technology (e.g., by transmitting data via a ZigBee network).

The A/V collection device 305 may be configured to collect data via one or more user interactions and cause transmission of some or all of the collected data to a destination outside the premises 300 (e.g., destination device 320). For example, the A/V collection device 305 may be a digital assistant, voice assistant, smart speaker, or some other device that is capable of both connecting to a network and collecting audio (e.g., via one or more microphones) or video (e.g., via one or more cameras). Further, the A/V collection device 305 may be configured to analyze the received audio for particular utterances, words or phrases, which are often referred to as trigger words or phrases. The trigger words or phrases may cause the A/V collection device 305 to detect spoken commands or requests. The A/V collection device 305 may be a device that implements Alexa from Amazon, Google Assistant from Google, Ski from Apple, Cortana from Microsoft, or the like. The following table provides a few non-exhaustive examples of the various trigger words or phrases that may be used by an A/V collection device.

TABLE 1

| Example Software Implemented on A/V Collection Device | Example Spoken Trigger Word or Phrase | Example Commercial Devices |
| --- | --- | --- |
| Alexa from Amazon | "Alexa" | Amazon Echo, Amazon Echo Dot, computing device executing an Alexa application |
| Google Assistant from Google | "Hey Google" | Google Home, Google Home Mini, Google Home Smart Speaker, computing device executing a Google Assistant application |
| Siri from Apple | "Hey Siri" | iPad from Apple, iPad mini from Apple, iPhone (various models) from Apple, iPod touch, HomePod by Apple, computing device executing a Siri application |
| Cortana from Microsoft | "Hey Cortana" | Windows Phone 8.1, Microsoft Band, Xbox One, Invoke by Harman Kardon, computing device executing Windows 10, computing device executing a Cortana application. |

For example, a user 301 may speak a trigger word or phrase associated with the A/V collection device 305 (e.g., "OK Google"). The A/V collection device 305 may, based on determining that the trigger word was spoken, respond with an audible or visual indication that it is ready to receive a command. The user 301 may, by speaking additional words or phrases, proceed to interact with the A/V collection device 305 to input a command (e.g., "play classical music"). The A/V collection device 305 may, based on the command, transmit first data to the destination device 320 (e.g., transmit a request for a data stream based on the command to play classical music). The A/V collection device 305 may, based on the first data, receive second data from the destination device 320 or some other device associated with the destination device 320 (e.g., a data stream that includes data for a piece of classical music). The A/V collection device 305 may process the second data and generate an indication of the second data (e.g., generate, via one or more speakers, audio of the data stream).

The above example shows how a user 301 may interact with the A/V collection device 305 to trigger a process for inputting a command by speaking a trigger word or phrase. The A/V collection device 305 may be configured to trigger the process for inputting the command based on additional or alternative criteria. For example, if the A/V collection device 305 includes one or more cameras, the A/V collection device 305 may be configured to analyze video received via the one or more cameras to determine whether a human is present and/or determine whether a face of an authorized user is present. In the latter case relating to whether a face of an authorized user is present, the A/V collection device 305 may be configured to perform one or more facial recognition processes.

The above one or more examples shows one or more manners in which the user 301 may interact with the A/V collection device 305. The user 301 may expect that the A/V collection device 305 will transmit data outside the premises 300 based on these types of interactions with the A/V collection device 305. For example, the user 301 may expect that the A/V collection device 305 will transmit data (e.g., audio or video collected via, respectively, a microphone or camera of the A/V collection device) outside the premises 300 if the user 301 speaks the trigger word or phrase. However, the user 301 may not expect the A/V collection device 305 to transmit data during a conversation he or she is having with another person within the premises 300, or if the user 301 is otherwise not interacting specifically with the A/V collection device 305. In other words, the A/V collection device 305 may be capable of performing transmissions that the user 301 considers to be unauthorized. To prevent an unauthorized transmission by the A/V collection device 305, the gateway device 309 and the monitoring device 307 may be configured as part of a system that monitors for data transmissions from the A/V collection device 305 and routes or blocks each data transmission based on various criteria.

The monitoring device 307 may be configured to monitor for one or more types of data and may report data to the gateway device 309. For example, the monitoring device 307 may include a microphone and may be configured to monitor for audio. The monitoring device 307 may, based on receiving audio, determine whether the audio includes a trigger word or phrase for the A/V collection device 305. If the audio includes a trigger word or phrase for the A/V collection device 305, the monitoring device 307 may report data to the gateway device 309 (e.g., transmit, to the gateway device 309, an indication that a trigger word or phrase occurred). As another example, the monitoring device 307 may include a camera and be configured to monitor for video. The monitoring device 307 may, based on receiving video, determine whether a person is present within a frame of the video. If a person is present within the frame, the monitoring device 307 may report data to the gateway device (e.g., transmit, to the gateway device 309, an indication that a person is present).

The monitoring device 307, for monitoring the A/V collection device 305, may be placed in proximity to the A/V collection device 305 (e.g., within the same room of the premises 300). The monitoring device may installed at a fixed location (e.g., a video camera affixed to a wall). Proximity, however, may not require the installation of the monitoring device at a fixed location. For example, the monitoring device 305 may be a hand-held device that is in proximity based on its normal usage (e.g., a remote control, such as XR11 by Comcast, which has a built-in microphone).

The gateway device 309 may be configured to route, block, or otherwise enforce a level of control on data transmissions from the A/V collection device 305. If the gateway determines to route a data transmission, the routing may cause the gateway device 309 to forward the data transmission onto a network that is outside the premises 300 (e.g., WAN 315). Blocking a data transmission may, for example, cause the gateway device 309 to drop the data transmission; prevent an intended destination device, as indicated by the data transmission, from receiving the data transmission; and/or prevent routing of the data transmission from the gateway device 309. Further, regardless of whether the gateway device 309 determines to route or block the data transmission, the gateway device 309 may store the data transmission, or information based on the data transmission, for further analysis or later access.

The determination of whether to route or block a data transmission may be based on the occurrences of one or more trigger events and one or more enforcement mechanisms. Trigger events may include the occurrence of a trigger word or phrase within audio, the detection of human presence within video, the detection of human motion within video, or other types of trigger events that are discussed throughout this disclosure. Enforcement mechanisms may include a condition that is required to be satisfied prior to the gateway device 309 routing a data transmission outside the premises. Some enforcement mechanisms may be associated with a trigger event (e.g., a transmission window enforcement mechanism may be associated with a trigger event of the occurrence of a trigger word or phrase within audio). The following table provides a few non-exhaustive examples of enforcement mechanisms that can be used by the gateway device 309 as a basis for determining whether to route or block a data transmission from the A/V collection device 305. The gateway device 309 may determine whether to route or block a data transmission based on a combination of the following example enforcement mechanisms and/or trigger events.

TABLE 2

| Example Enforcement Mechanism | Example of Routing or Blocking Based on Example Enforcement Mechanism |
| --- | --- |
| Transmission window based on occurrence of a spoken trigger word or phrase within audio | All transmissions from an A/V collection device may be blocked unless a transmission window for, or associated with, the A/V collection device is open. A monitoring device may analyze received audio and transmit, to a gateway device, an indication that a trigger word or phrase associated with the A/V collection device occurred. Based on receiving the indication, the gateway device may open a transmission window for, or associated with, the A/V collection device. The gateway device may route communications from the A/V collection device outside the premises while the transmission window is open. The transmission window may remain open for a period of time and may be closed once the period of time has elapsed. Throughout this disclosure, a transmission window for an A/V collection device may be used interchangeably with a transmission window associated with an A/V collection device. |

TABLE 2-continued

| Example Enforcement Mechanism | Example of Routing or Blocking Based on Example Enforcement Mechanism |
|---|---|
| Transmission window based on presence of a human within video | All transmissions from an A/V collection device may be blocked unless a transmission window for the A/V collection device is open. A monitoring device may analyze received video and transmit, to a gateway device, an indication that presence of a human is detected. Based on receiving the indication, the gateway device may open a transmission window for the A/V collection device. The gateway device may route communications from the A/V collection device outside the premises while the transmission window is open. The transmission window may remain open for a period of time or until the monitoring device transmits an indication that presence of a human is not detected. |
| Enforce data encryption based on whether data of a data transmission from an A/V collection device is encrypted | All transmissions from an A/V collection device may be blocked unless data within a data transmission is encrypted. |
| Enforce routing to specific destination devices based on an intended destination device indicated by a data transmissions from an A/V collection device | All transmissions from an A/V collection device may be blocked unless an intended destination device of a transmission is on a list of authorized destination devices. |

A trigger event, and whether it occurred or not, may be determined based on data reported from a monitoring device. For example, if a trigger event is the occurrence of the spoken trigger word or phrase and the enforcement mechanism is a transmission window based on the occurrence of the spoken trigger word or phrase, a gateway device 309 may be configured to block any data transmission from the A/V collection device 305 unless the data transmission is received while the transmission window is open. The gateway device 309 may open the transmission window based on receiving, from the monitoring device 307, an indication that the trigger word or phrase occurred. Accordingly, based on the transmission window being open, the gateway device 309 may route any data transmission from the A/V collection device 305 that is received within a period of time associated with the transmission window or until the transmission window is otherwise closed by the gateway device 309.

The gateway device 309, for determining whether to route or block a data transmission, may perform a configuration process to establish one or more criteria for monitoring the A/V collection device 305 and/or for performing the various determinations of whether to route or block a data communication. The gateway device 309 may, based on the criteria, determine a monitoring profile for the A/V collection device 305 and cause the monitoring device 307 to configure itself to perform a particular monitoring procedure. Further details on one or more configuration processes will be discussed below.

While the operating environment of FIG. 3 shows a single monitoring device (e.g., device 307) and a single A/V collection device (e.g., device 305), multiple of both types of devices could be present in the premises 300. A single monitoring device may be performing a monitoring procedure for two or more A/V collection devices. Two or more monitoring devices may each be performing a monitoring procedure for a single A/V collection device. Two or more monitoring devices may each be performing a monitoring procedure for two or more A/V collection devices.

Figure 4:
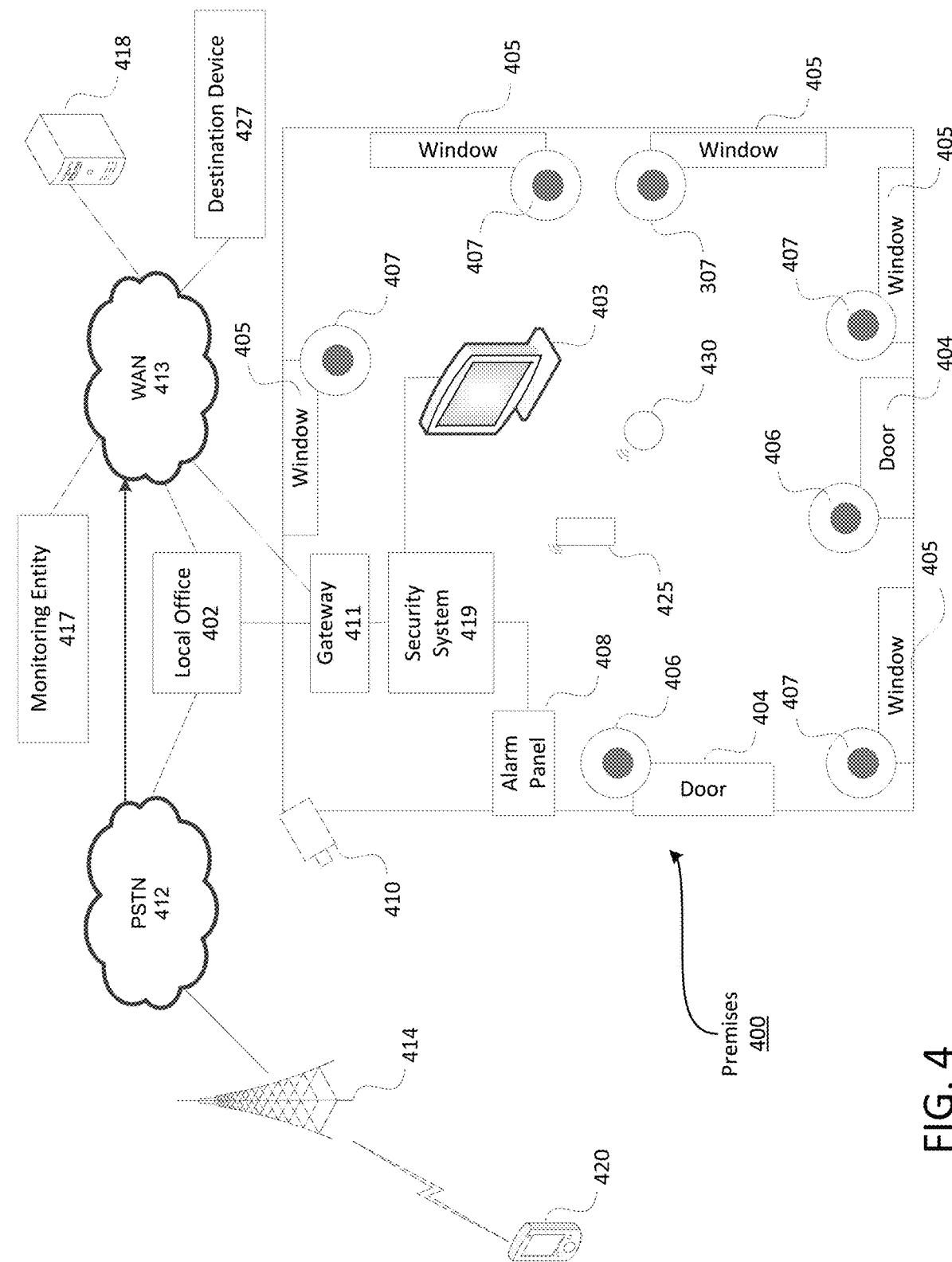

FIG. 4 shows an example operating environment in which various features described herein may be implemented. Indeed, if the operating environment of FIG. 3 shows a more general example operating environment, FIG. 4 shows a more detailed example operating environment. In particular, FIG. 4 shows an example environment that includes components and devices associated with providing a security monitoring system. The security monitoring system may monitor a premises 400 (which may correspond to one of the premises 102 of FIG. 1, or the premises 300 of FIG. 3), such as a user residence, business, recreational facility, etc. The example operating environment of FIG. 4 includes a monitoring device 430. The monitoring device 430 may be any component or device associated with the security monitoring system (e.g., camera 410) or another device capable of communicating with the gateway 411 (e.g., a remote control with a built-in microphone). Thus, various components of the security monitoring system may be used to monitor A/V collection device 425 as it, for example, attempts to transmit from the premises 400 to a destination device 427. To provide one or more examples related to the various ways in which a security monitoring system may implement features for monitoring the A/V collection device 425, the following discussion provides a non-exhaustive overview of the security monitoring system shown in FIG. 4.

With respect to the various components of the security monitoring system, the premises 400 may include a number of entry points that are to be monitored by a security system 419 (which may correspond to the security system 213 of FIG. 2) and various other security components (e.g., security sensors 406 and 407, cameras 410, lights 415, alarm panel 408, etc.). Each entry point, as shown in FIG. 4, corresponds to one of the doors 404 or windows 405 of the premises 400.

Each entry point may be monitored by one or more sensors, such as security sensors 406 and 407. Each security sensor may be communicatively coupled to the security system 419. For example, as shown in FIG. 4, each entry point that is a door has one or more sensors 406 for monitoring a door. Each entry point that is a window has one or more sensors 407 for monitoring a window. Security system 419 may be able to receive or otherwise monitor data from the security sensors 406 and 407. The security sensors 406 for monitoring a door may be a different combination of sensors than the security sensors 407 for monitoring a window (e.g., a door may be provided with a switch sensor that is different from the types of sensors provided for the windows). However, the security sensors 406 for monitoring a door may include one or more of the same types of sensors as the security sensors 407 for monitoring a window (e.g., each door and each window is provided with at least one sensor that includes an accelerometer, a magnetometer, and/or a pressure sensor).

A security sensor may be of any type suitable for monitoring some aspect of an entry point or the premises. Non-limited examples of security sensors include video cameras, microphones, ambient light sensors, passive infrared sensors, humidity sensors, temperature sensors, carbon dioxide sensors, carbon monoxide sensors, seismic sensors, pressure sensors, seismometers, magnetometers, accelerometers, mercury switches, gyroscopes, pressure sensitive door mats, proximity sensors, or the like.

In addition to the sensors associated with the doors 404 and windows 405, the premises 400 may also include additional security sensors that are not located at a specific entry point. As shown in FIG. 4, one or more cameras 410 may be placed at various locations at the premises 400, such as a traffic area of the premises 400 (e.g., video camera 410 may be placed to monitor a hallway or a particular room of the premises 400) or an exterior area of the premises 400 (e.g., a porch area or driveway area of the premises 400). Images, sounds, and other data captured by a camera 410 or other sensor may be transmitted by the security system 419, for example, as an email, text message, or through a software application to, for example, a remote or local user or device, for analysis and/or a predetermined and/or dynamically determined action.

The security system 419 may be configured to control, monitor and/or receive from the various security components depicted in FIG. 4, including the various security sensors 406 and 407, the one or more lights 415, and the one or more cameras 410. The security system 419 may be configured to place the security components in various states (e.g., deactivate a sensor, activate a sensor, disarm a sensor, arm a sensor). A user may be able to interact with the security system 419 to configure the state of the various security components and the state of the security system 419. For example, an alarm panel 408 may be implemented in proximity to and/or as part of the security system 419. The security system 419 may be configured to automatically place the security components in various states. For example, the security system 419 may be able to automatically arm the system and its security components after detecting that a person is near an entry point (e.g., arm the system if a person is detected near a rear door of the monitored premises based on video received from a video camera monitoring the rear door). The security system 419 may be configured to place the security components into various states based on an alert level (e.g., the security components are disarmed and/or deactivated based on a "green" alert level; some security components are armed and/or activated based on a "yellow" alert level; and all security components are armed and/or activated based on a "red" alert level).

The various states for the security system 419 and the security components depicted in FIG. 4 may include an armed state (e.g., alarms can be raised), a disarmed state (e.g., alarms are not raised), a disabled state (e.g., power is turned off and/or monitoring is not performed) and an active state (e.g., power is turned on and/or monitoring is performed). For example, the user may arm the security system 419; arm specific entry points (e.g., arm the sensors for a door 404); arm specific security sensors (e.g., arm one or more of the security sensors 406); deactivate various security sensors (e.g., activate camera 410); and the like.

The security system 419 may perform various actions such as, for example, causing an audible alarm sound to be played, causing an alarm message to be presented on the alarm panel 408, causing lights in the premises 400 to be turned on/off, causing additional sensors to be activated (e.g., turning on video cameras), cause a message to be sent to a mobile device 420 or to a monitoring entity 417. For example, these various actions may be performed after or based on an alarm being triggered or raised.

Security system 419 and/or alarm panel 408 may be implemented in a computing device, such as a device depicted in FIG. 2. The security system 419 and/or alarm panel 408 may be implemented as part of a gateway, such as a gateway device depicted in FIG. 1 or FIG. 3. Gateway 411, for example, may be communicatively coupled to the security sensors 406 and 407 and the other security components depicted in FIG. 4, which may allow gateway 411 to arm, disarm, deactivate, activate and/or monitor the security sensors 406 and 407 and the various other security components depicted in FIG. 4.

The security sensors 406 and 407, cameras 410, light 411, alarm panel 408, and security system 419 may be communicatively coupled to a user interface device, such as the television 403 or the various devices depicted in FIG. 1, including the personal computer 114, the tablet 120 and/or the wireless device 116. Through interactions with the user interface device, an authorized user may configure any of the security components depicted in FIG. 4. The security components may also transmit data between each other and/or the user interface device. For example, data (e.g., pictures, video, audio, various types digital or analog signal, and the like) from one of the security components (e.g., camera 410 or security sensor 406) may be transmitted to the user interface device for display.

The security system 419 may be configured to confirm the location and identity of a user or other individual in the premises 400. For example, the security system 419 may determine the location of a user based on GPS location of a cellular device (e.g., mobile device 420). The security system 419 may also verify the identity of each user in the security network within premises 400 using several known recognition techniques, including for example, known key code, voice recognition, facial recognition, pattern recognition, body-mass recognition, fingerprint recognition, retina scanner recognition, and the like. The various recognition processes may be based on data collected from various security components within premises 400 or from another device in which the user provides the data (e.g., via a microphone of mobile device 420). For example, the data may be collected, from a camera, microphone, infrared sensor, fingerprint scanner, biometric sensor, or other type of sensor.

FIG. 4 also shows that the security system 419 may communicate with other entities, such as the local office 402 and the monitoring entity 417. Thus, the security system 419 may transmit data to the local office 402 or the monitoring entity 417. The data may include any data that could be monitored and/or recorded by the security system 419 or the other security components. For example, the data may include information for an event detected by the security system 419 (e.g., a notification indicating there was a knock on a door), information for an alarm triggered by the security system (e.g., a notification that an alarm was triggered at the premises 400), or information related to the monitoring of the A/V collection device 425.

Based on communications from the security system 419, the local office 402 may record information related to the security of the premises 400 and/or the monitoring of the A/V collection device 425. As some example, the local office 402 may store information identifying the sensor(s) that were tripped, the location of the sensor(s) in the premises 400; record video and/or audio that depicts events that occurred during a time-period based on when the alarm was triggered; record time stamps of an unauthorized data transmission from A/V collection device 425; store the unauthorized data transmission that was blocked from routing to the destination device 427; and the like. Based on the recorded information, the local office 402 may determine an appropriate reaction and may transmit a signal to an external network, such as the public switched telephone network PSTN 412 and/or a wide area network WAN 413 (or the various networks depicted in FIG. 1, such as links 101 and network 109). For example, data may be transmitted to and/or from the local office 402 and a user's mobile device 420 (e.g., via the PSTN 412 and the cell tower 414). In this manner, the user may receive notifications related to the security of the premises 400; receive notifications related to the monitoring of the A/V collection device 425; and/or be able to control the security system 419 via the mobile device 420. The notifications may be received by the mobile device 420 in various forms including, for example, an email, text message, or phone call. The user may receive the notifications via a dedicated software application installed on the mobile device 420 or via another application (e.g., an e-mail client or a text message client).

The local office 402 and/or the security system 419 may transmit information related to the security of the premises 400 and/or the monitoring of the A/V collection device 425 to a monitoring entity 417 via one or more networks, such as the WAN 413 (e.g., the internet). The monitoring entity 417 may be operated by the same entity that operates the local office 402 (e.g., the monitoring entity 417 and the local office 402 may be operated by the same service provider, which may also be the same service provider that operates the distribution network 100 of FIG. 1) or a third party entity (e.g., the monitoring entity 417 may be a third-party home security provider). The monitoring entity 417 may be responsible for monitoring the premises 400. This may include responding to information, received from the security system 419 or the local office 402, that indicates an alarm was triggered for premises 400 or some other type of event occurred at the premises 400 (e.g., the A/V collection device 425 attempted an unauthorized data transmission). For example, a representative or automated system of the monitoring entity 417 may, based on receiving notification that an alarm was triggered for premises 400 or after receiving notification that the A/V collection device 425 attempted an unauthorized data transmission, contact (e.g., via a phone call, e-mail, text, and/or other type of message that can be received by mobile device 420) a user to provide notification of the same.

The local office 402 and/or the security system 419 may transmit information related to the security of the premises 400 or the monitoring of A/V collection device 425 to a web portal server 418 via one or more networks, such as the WAN 413. The web portal server 418 may be configured to manage an account for the user and/or store information related to the security of the premises 400 and/or the monitoring of the A/V collection device 425. The information may include, for example, a history of alarms, a history of data transmissions associated with the A/V collection device 425, and a history of other events that occurred at the premises 400. The web portal server 418 may be a computing device capable of providing a web portal through which users may view, on any connected display device, the stored information. The user may access the web portal using any device that can connect to web portal server 418 via the WAN 413.

A user may log onto the web portal (via an authentication process) and view the stored information. The user may be able to view video from the various cameras 410 located in the premises 400; check and/or control the status of the security system 419 and the various security components of the premises 400 (e.g., to see if the security system 419 is armed and then arm or disarm the system as desired); or view the content of a data transmission from the A/V collection device 425 that was routed or blocked. For example, if the gateway device 411 determined to block a data transmission, the gateway device may store the data transmission so a user may view the content of the data transmission via the web portal.

The web portal may also allow a user to customize settings for the security system 419 and the various security components of premises 400. For example, a user may, via the web portal, customize a schedule to indicate when and how the security system 419 should operate (e.g., indicate certain times during which the security system 419 is to automatically arm/and or disarm itself) and/or indicate how the A/V collection device 425 should be monitored. (e.g., a user may, via the web portal, select one or more of the enforcement mechanisms discussed in connection with Table II for monitoring the A/V collection device 425).

While the operating environment of FIG. 4 shows a single monitoring device (e.g., device 430) and a single A/V collection device (e.g., device 425), multiple of both types of devices could be present in the premises 400. A single monitoring device (e.g., monitoring device 430) may be performing a monitoring procedure for two or more A/V collection devices (e.g., two voice assistants located in or near the same room). Two or more monitoring devices may each be performing a monitoring procedure for a single A/V collection device (e.g., a remote control and a video camera may be monitoring a voice assistant in a room). Two or more monitoring devices may each be performing a monitoring procedure for two or more A/V collection devices (e.g., a remote control and a video camera may be monitoring two voice assistants located in or near the same room).

To illustrate an example system in practice, an example flow will be discussed in connection with FIGS. 5A-5E. In particular, FIGS. 5A-5E show an example flow that includes the monitoring of two A/V collection devices 503 and 505 by a single monitoring device 507 and a gateway device 509. The devices 503, 505, 507 and 509 may be located within a premises. Each of devices 503, 505 and 507 includes its own microphone. During the course of the example flow, the first A/V collection device 503, based on a command from user 501, may attempt to transmit to first destination device 511. The example flow of FIGS. 5A-5E could occur based on the systems depicted in FIGS. 3 and 4. The example flow of FIGS. 5A-5E could also occur based on the various methods described below in connection with FIGS. 6A, 6B, 7, 8, 9A and 9B being performed by the devices 503, 505, 507 and 509.

The example flow of FIGS. 5A-5E includes, for example, a transmission window for the first A/V collection device 503 and an enforcement of specific destination devices for the first A/V collection device 503. The transmission window for the first A/V collection device 503 is associated with a trigger event of the occurrence of a trigger word or phrase for the first A/V collection device 503. The example flow of FIGS. 5A-5E includes, for example, a transmission window for the second A/V collection device 505. The transmission window for the second A/V collection device 505 is associated with a trigger event of the occurrence of a trigger word or phrase for the second A/V collection device 505.

The example flow begins, at 521-543, with an illustration of an initial process for establishing a monitoring procedure for the first A/V collection device 503 and the second A/V collection device 505. The various transmissions and processes described in connection with 521-543 may result from performance of one or more methods similar to those discussed below in connection with FIGS. 6A, 6B, and 7.

At 521, the user 501 may configure the first A/V collection device 503. This configuration process may include inputting the network information for attempting to connect the first A/V collection device 503 to a network of the premises. This configuration process may depend on the specific type of A/V collection device. For example, a configuration process for a digital assistant may be different from a configuration process for a smart speaker; a configuration process for a device implementing Alexa from Amazon may be different from a configuration process for a device implementing Google Assistant from Google.

At 523, the first A/V collection device 503 may transmit a request to join a network. This request may be received by the gateway device 509. The gateway device 509 may register the first A/V collection device 503 and may assign a first network address to the first A/V collection device 503. For example, the gateway device 509 may register and assign after or based on receipt of the request to join the network. At 525, the gateway device 509 may transmit, to the first A/V collection device 503, the first network address that was assigned to the first A/V collection device 503. At 527, the gateway device 509 may transmit, to the first A/V collection device 503, a request for one or more transmission parameters. Transmission parameters may include various characteristics of the data transmissions that the first A/V collection device is to perform.

At 529, the first A/V collection device 503 may transmit an indication of the trigger word or phrase for the first A/V collection device 503, and an indication of the first destination device 511. For example, the first A/V collection device 503 may transmit the indication of 529 based on the request for the one or more transmission parameters. For this example flow, the trigger word or phrase for the first A/V collection device 505 may be "Alexa". The indication of the first destination device 511 may be an address or other network identifier for the first destination device 511.

The indication of the trigger word or phrase for the first A/V collection device 503, and the indication of the first destination device 511 are examples the different types of transmission parameters that may be transmitted by the first A/V collection device 503 to the gateway device 509. Examples of transmission parameters include an indication of an encryption key used by the first A/V collection device 503 to encrypt data, an indication of a decryption key used to decrypt a data transmission from the first A/V collection device 503, an indication of the trigger word or phrase for the first A/V collection device, and/or an indication of one or more destination devices for data transmissions from the first A/V collection device 503.

At 531, the gateway device 509 may transmit the indication of the trigger word or phrase for the first A/V collection device 503. For example, the gateway device 509 may transmit the indication at 531 based on the response of the first A/V collection device 503 to the request for the one or more transmission parameters. The indication of the trigger word or phrase for the first A/V collection device 503 is an example of the different types of monitoring parameters that may be transmitted by the gateway device 509 to the monitoring device 507. Monitoring parameters may indicate one or more criteria for use by the monitoring device 507 when performing a monitoring procedure associated with the first A/V collection device 503. Examples of monitoring parameters include an indication of detected human presence or an indication of detected human motion.

The gateway device 509 may determine a monitoring profile for the first A/V collection device 503. Details of the monitoring profile will be discussed below. In general, a monitoring profile may be used by a gateway device to determine whether to route or block a data transmission. Further, a monitoring profile may include information that indicates a status of the various trigger events (e.g., an indication of whether the trigger word or phrase has occurred), information that indicates a status of the various enforcement mechanisms (e.g., an indication of whether a transmission window is open or closed), and any other information associated with an A/V collection device or a monitoring device (e.g., an indication that the monitoring device 507 is associated with the A/V collection device 503). For this example flow, the gateway device 509 may generate and store a monitoring profile for the first A/V collection device 503 that includes an indication that a transmission window for the first A/V collection device 503 closed, an indication of the first network address assigned to the first A/V collection device 503, an indication of a period of time for opening the transmission window, and the indication of the first destination device 511. Further, based on the indication that the transmission window for the first A/V collection device 503 is closed, the gateway device 509 may block each data transmission from the first A/V collection device 503.

The monitoring device 507 may configure a monitoring procedure. For example, a the monitoring device 507 may configure a monitoring procedure based on the indication of the trigger word or phrase for the first A/V collection device. Upon configuration, the monitoring device 507 may be configured to analyze received audio for an occurrence of the trigger word or phrase for the first A/V collection device 503 and, if it is determined that the trigger word or phrase for the first A/V collection device 503 occurred within audio, the monitoring device 507 may transmit an indication of the occurrence to the gateway device 509.

At 533, the user 501 may configure the second A/V collection device 505. This configuration process may include inputting the network information for attempting to connect the second A/V collection device 505 to the network of the premises.

At 535, the second A/V collection device 505 may transmit a request to join a network. This request may be received by the gateway device 509. The gateway device 509 may register the second A/V collection device 505 and may assign a second network address to the second A/V collection device 505. For example, the gateway device 509 may register and assign after or based on receipt of the request to join the network.

At 537, the gateway device 509 may transmit, to the second A/V collection device 505, the second network address that was assigned to the second A/V collection device 505. At 539, the gateway device 509 may transmit, to the second A/V collection device 505, a request for one or more transmission parameters.

At 541, the second A/V collection device 505 may transmit an indication of the trigger word or phrase for the second A/V collection device 505. For example, the second A/V collection device 505 may transmit the indication of the trigger word or phrase for the second A/V collection device 50 based on the request for the one or more transmission parameters. For this example flow, the trigger word or phrase for the second A/V collection device 505 may be "Hey Google". For this example flow, the trigger word or phrase for the second A/V collection device 505 ("Alexa") is different from the trigger word or phrase for the first A/V collection device 503 ("Hey Google").

At 543, the gateway device 509 may transmit the indication of the trigger word or phrase for the second A/V collection device 505. For example, the gateway device 509 may transmit the indication at 543 based on the request for the one or more transmission parameters.

The gateway device 509 may determine a monitoring profile for the second A/V collection device 505. For this example flow, a monitoring profile for the second A/V collection device 505 may include an indication that a transmission window for the second A/V collection device 505 is closed, an indication of the second network address assigned to the second A/V collection device 505, and an indication of a period of time for opening the transmission window. The gateway device 509 may block each data transmission from the second A/V collection device 505. For example, the gateway device 509 may block each data transmission from the second A/V collection device based on the indication that the transmission window for the second A/V collection device 505 is closed.

The monitoring device 507 may configure a monitoring procedure. For example, the monitoring device 507 may configure a monitoring procedure based on the indication of the trigger word or phrase for the second A/V collection device 505. Upon configuration, the monitoring device 507 may be configured to analyze received audio for an occurrence of the trigger word or phrase for the second A/V collection device 505 and, if it is determined that the trigger word or phrase for the second A/V collection device 505 occurred within audio, the monitoring device 507 may transmit an indication of the occurrence to the gateway device 509.

The example flow proceeds, at 547-573, to show one or more examples where the gateway device 509 routes or blocks data transmissions from the first A/V collection device 503 and the second A/V collection device 505. The various transmissions and processes described in connection with 547-573 may result from performance of one or more methods similar to those discussed below in connection with FIGS. 8, 9A and 9B.

At 547, the user 301 may speak the trigger word or phrase for the first A/V collection device 503 (e.g., "Alexa"). Audio of the trigger word or phrase, via the microphones, may be received by the first A/V collection device 503, the second A/V collection device 505, and the monitoring device 507.

The monitoring device 507 may analyze the audio and determine that the trigger word or phrase for the first A/V collection device 503 has occurred within the audio. For example, the monitoring device 507 may, based on receipt of the trigger word or phrase via its microphone, analyze and determine that the trigger word or phrase for the first A/V collection device 503 has occurred within the audio. At 549, the monitoring device may transmit, to the gateway device 509, an indication that the trigger word or phrase for the first A/V collection device occurred.

The indication that the trigger word or phrase for the first A/V collection device has occurred is an example of the types of data the monitoring device may report to the gateway device 509. One or more examples are discussed below when discussing the reporting data of FIG. 8. Indeed, the transmission at 949 may result from or otherwise be based on the monitoring device 507 performing a method similar to those discussed in connection with FIG. 8.

At 551, the gateway device 509 may open the transmission window for the first A/V collection device 503. For example, the gateway device 509 may, based on receipt of the indication that the trigger word or phrase for the first A/V collection device 503 has occurred, open the transmission window for the first A/V collection device 503. Opening the transmission window for the first A/V collection device 503 may include modifying the monitoring profile for the first A/V collection device 503 such as, for example, by storing an indication that the transmission window for the first A/V collection device 503 is open and setting a timer based on the period of time indicated by the monitoring profile. The opening of the transmission window at 551 may result from or otherwise be based on the gateway device 509 performing a method similar to those discussed in connection with FIG. 9A (e.g., steps 801-809 of FIG. 9A).

At 553, the user 301 may speak a command for the first A/V collection device 503 (e.g., "Play classical music"). Audio of this command may be, via the microphones, received by the first A/V collection device 503, the second A/V collection device 505, the monitoring device 507.

At 555, the first A/V collection device 503 may attempt a first data transmission that is ultimately intended for the first destination device 511. This data transmission may be performed based on receiving the audio of the command. The gateway device 509 may receive the first data transmission, for example, prior to the first data transmission being routed outside the premises.

At 557, the gateway device 509 may route the first data transmission to the first destination device 911. For example, the gateway device 509 may, based on determining that the transmission window for the first A/V collection device 503 is open, route the first data transmission to the first destination device 911. The determination that the transmission window for the first A/V collection device 503 is open may be based on the monitoring profile for the first A/V collection device 503 including an indication that the transmission window for the first A/V collection device 503 is open. The routing of the first data transmission at 557 may result from or otherwise be based on the gateway device 509 performing a method similar to those discussed in connection with FIG. 9B (e.g., steps 951-955 and 957 of FIG. 9B).

At 559, the second A/V collection device 505 may attempt a second data transmission. The gateway device 509 may receive the second data transmission, for example, prior to the second data transmission being routed outside the premises.

At 561, the gateway device 509 may block the second data transmission. For example, the gateway device 509 may, based on determining that the transmission window for the second A/V collection device 505 is closed, block the second data transmission. The determination that the transmission window for the second A/V collection device 505 is closed may be based on the monitoring profile for the second A/V collection device 505 including an indication that the transmission window for the second A/V collection device 505 is closed. The blocking of the second data transmission at 561 may result from or otherwise be based on the gateway device 509 performing a method similar to those discussed in connection with FIG. 9B (e.g., steps 951-955 and 959 of FIG. 9B).

At 563, the first A/V collection device 503 may attempt a third data transmission that is ultimately intended for a second destination device (not shown). The gateway device 509 may receive the third data transmission, for example, prior to the third data transmission being routed outside the premises.

At 565, the gateway device 509 may block the third data transmission. For example, the gateway device 509 may, based on determining that the second destination device is not an authorized destination, block the third data transmission. The determination that the second destination device is not an authorized destination may be based on the monitoring profile for the first A/V collection device 503 not including an indication of the second destination device. For example, the gateway device 509 may extract an indication of the second destination device from the third data transmission and may determine whether the monitoring profile includes the indication of the second destination device. In this example flow, the monitoring profile for the first A/V collection device 503 includes an indication of the first destination device 511, but not an indication of the second destination device. Thus, the gateway device 509 may determine that the second destination device is not an authorized destination. The blocking of the third data transmission at 565 may result from or otherwise be based on the gateway device 509 performing a method similar to those discussed in connection with FIG. 8B (e.g., steps 951-955 and 959 of FIG. 9B).

At 567, the gateway device 509 may close the transmission window for the first A/V collection device 903. For example, the gateway device 509 may, based on an expiration of the period of time associated with the transmission window for the first A/V collection device 503, close the transmission window for the first A/V collection device 903. The period of time may be indicated by the monitoring profile for the first A/V collection device 503. Closing the transmission window may include modifying or updating the monitoring profile for the first A/V collection device 503, such as by storing an indication that the transmission window for the first A/V collection device 503 is closed. The closing of the transmission window at 567 may result from or otherwise be based on the gateway device 509 performing a method similar to those discussed in connection with FIG. 9B (e.g., steps 961 and 963 of FIG. 9B).

At 569, the first A/V collection device 503 may attempt a fourth data transmission. The gateway device 509 may receive the fourth data transmission, for example, prior to the fourth data transmission being routed outside the premises.

At 571, the gateway device 509 may block the fourth data transmission. For example, the gateway device 509 may, based on determining that the transmission window for the first A/V transmission window 503 is closed, block the fourth data transmission. The determination that the transmission window for the first A/V collection device 503 is closed may be based on the monitoring profile for the first A/V collection device 503 including an indication that the transmission window for the first A/V collection device 503 is closed. The blocking of the fourth data transmission at 571 may result from or otherwise be based on the gateway device 509 performing a method similar to those discussed in connection with FIG. 9B (e.g., steps 951-955 and 959 of FIG. 9B).

At 573, the user may access a web portal to view information related to the transmissions of the A/V collection devices 503 and 505. The web portal may allow the user to view information or statistics related to the routing and/or blocking of the four data transmissions. The web portal may have received the information or statistics based on the gateway device 509 having performed a method similar to those discussed in connection with FIG. 9B (e.g., steps 965-969 of FIG. 9B).

The example flow of FIGS. 5A-5E is only one of the many different examples that could occur based on the aspects described throughout this disclosure. The number of A/V collection devices and/or monitoring devices may be different under different examples. Different enforcement mechanisms and/or different trigger events may result in different data being transmitted or processed at various instances. For example, under a different example flow, the transmission at 529 may include additional or alternative transmission parameters, such as an encryption key and decryption key used to encrypt/decrypt a data transmission; the transmission at 531 may include additional or alternative monitoring parameters, such as an indication that the monitoring device 507 is to monitor video and/or detect human presence; the transmission at 541 may include additional or alternative transmission parameters); and the transmission at 543 may include additional or alternative monitoring parameters. Further, under a different example flow and based on the differences in data transmitted at items 541 and 543, the monitoring device 507 may configure itself differently (e.g., configure a monitoring procedure to monitor video and detect human presence within the video). Throughout this disclosure are a number of different examples that could be shown in a similar flow as the example flow of FIGS. 5A-5E.

As shown in the example operating environments of FIGS. 3 and 4, and in the process flow of FIGS. 5A-5E, a gateway device and one or more monitoring devices may be configured as part of a system that monitors for data transmissions from one or more A/V collection devices. The gateway device may route or block each data transmission based on various criteria. To monitor particular A/V collection devices, each of the gateway device and each of the one or more monitoring devices may need to be configured to perform aspects related to monitoring of one or more A/V collection devices. The example methods of FIGS. 6A, 6B and 7 include processes for configuring a gateway device and one or more monitoring devices to establish the monitoring of an A/V collection device.

Figure 6A:
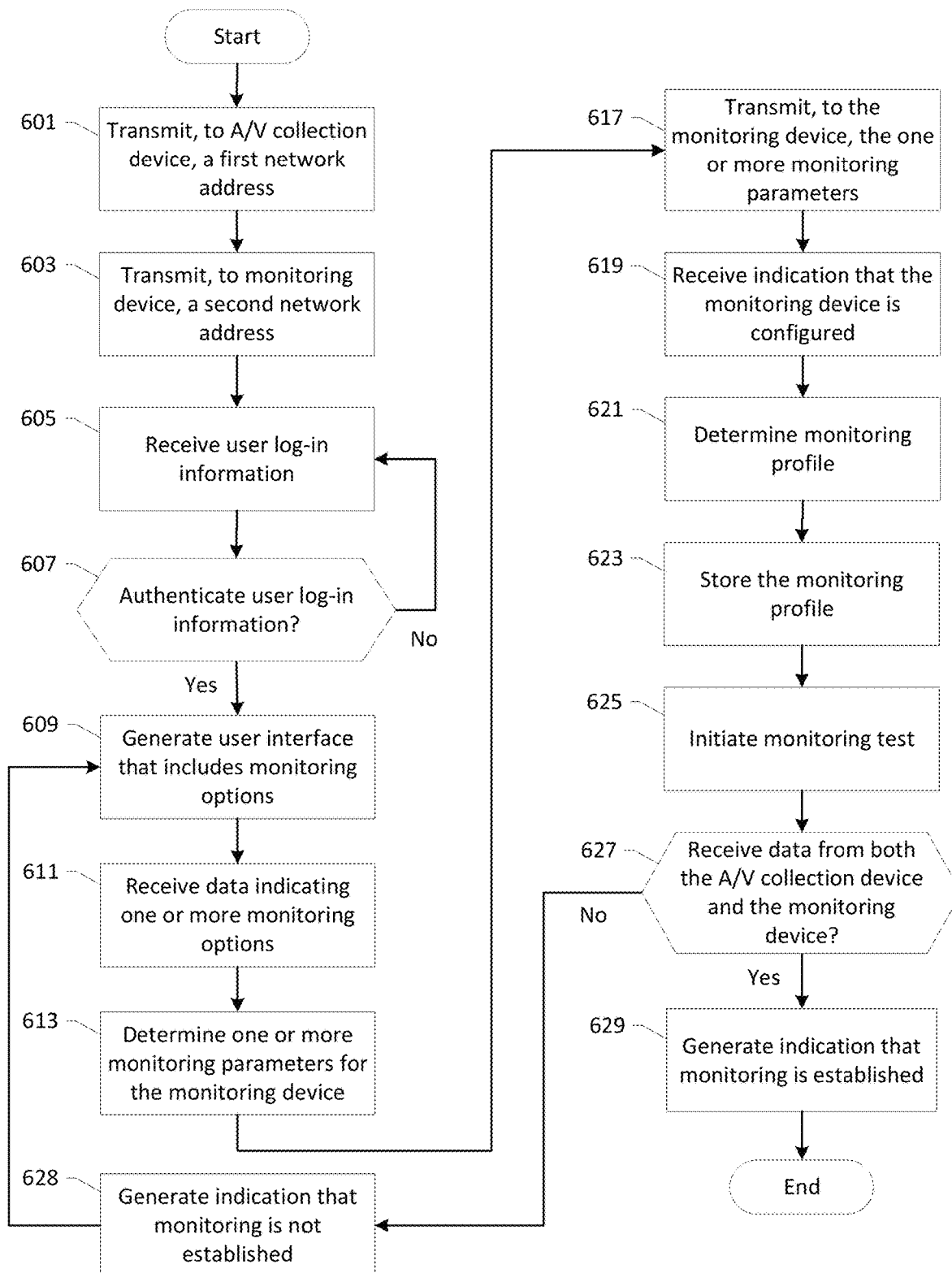

FIG. 6A shows one or more example methods that relate to a user interacting with a gateway device to manually input data and/or make selections that are as a basis for monitoring of one or more A/V collection devices. The one or more example methods of FIG. 6A may be suitable for use by a gateway device. Because it may be possible to include one or more computing devices that collectively perform the aspects related to the gateway device, the steps of FIG. 6A will be discussed as being performed by one or more computing devices. The gateway device may require a user log in with a user name and password prior to allowing the user to manually input the data and/or make the selections.

At step 601, one or more computing devices may transmit, to an A/V collection device, a first network address. This transmission may be performed based on an earlier request by the A/V collection device to join a network (e.g., network 310 of FIG. 3) or an earlier request by the A/V collection device for assignment of a network address. The first network address, for example, may be an IP address assigned to the A/V collection device for communicating via the network.

At step 603, the one or more computing devices may transmit, to a monitoring device, a second network address. This transmission may be performed based on an earlier request by the monitoring device to join a network (e.g., network 310 of FIG. 3) or an earlier request by the monitoring device for assignment of a network address. The second network address, for example, may be an IP address assigned to the monitoring device for communicating via the network, or may be an address assigned to the monitoring device for communicating with a ZigBee network.

The example provided by steps 601 and 603 indicate that the one or more computing devices communicate with an A/V collection device and a monitoring device via an IP network or a ZigBee network. However, different communication technologies could be used. For example, the one or more computing devices may communicate with the A/V collection device and/or the monitoring device via Bluetooth. If communicating via Bluetooth, the one or more computing devices may transmit data as part of a pairing process with the A/V collection device or the monitoring device. Further, the one or more computing devices may communicate with the A/V collection device (e.g., via an IP network) differently from the manner in which the one or more computing devices communicate with the monitoring device (e.g., via Bluetooth or ZigBee).

At step 605, the one or more computing devices may receive user log-in information. The user log-in information may include a user name and password. To provide the user log-in information, a user may have interacted with a user interface to input the information. The user interface may be displayed on a display device (e.g., television 403 of FIG. 4) associated with the one or more computing devices or a user device (e.g., mobile phone 420 of FIG. 4).

At step 607, the one or more computing devices may determine whether to authenticate the user log-in information. For example, if the user name and password both match expected values, the user log-in information may be authenticated and the method may proceed to step 609. If the user name and password do not both match the expected values, the user log-in information may not be authenticated and the method may proceed to step 605 to allow the user to re-input the user log-in information.

At step 609, the one or more computing devices may generate a user interface that includes monitoring options. The monitoring options may be presented by the user interface as a series of prompts and/or selections. For example, the user interface may include a listing of networked devices connected to a network (e.g., a listing that includes device 307 of FIG. 3), a listing of security sensors (e.g., a listing that includes video camera 410 of FIG. 4), and/or a listing of other devices associated with the one or more computing devices (e.g., a listing that includes one or more remote controls in communication with the gateway 411 of FIG. 4, such as device 430). The user interface may prompt the user to, based on the listing of networked devices and/or the listing of security sensors, indicate which device is an A/V collection device and which device is a monitoring device (e.g., indicate that a device having the first network address is an A/V collection device, and indicate that a device having the second network address is a monitoring device).

The user interface may prompt for various options related to the A/V collection device. For example, the user interface may prompt the user to indicate which type of A/V collection device is to be monitored (e.g., indicate that the A/V collection device is a product from the Echo line produced by Amazon, a product implementing Alexa from Amazon, a product implementing Siri from Apple, a product implementing Google Assistant from Google, a HomePod from Apple, an XR18 from Comcast, or the like). The user interface may prompt the user to indicate a trigger word or phrase associated with the A/V collection device (e.g., indicate that the A/V collection device is triggered by the phrase "OK Google", "Hey Siri", "Alexa", or some other word or phrase). The user interface may prompt the user to indicate one or more destinations that should be authorized for the A/V collection device (e.g., indicate that the destinations associated with Amazon, Google, Apple, or the like, are authorized).

The user interface may prompt for various options related to the monitoring device or the one or more computing devices. For example, the user interface may prompt the user to indicate a type of monitoring device (e.g., indicate that the monitoring device is a remote control with a built-in microphone, a video camera with or without a microphone, or the like). The user interface may prompt the user to indicate a type of data that the monitoring device will monitor (e.g., indicate that the monitoring device will monitor audio, video, images, or a combination thereof). The user interface may prompt the user to indicate one or more criteria for opening a transmission window for the A/V collection device (e.g., indicate a time the data transmission should remain open, indicate that the transmission window should open based on occurrence of the trigger word or phrase within audio, indicate that the transmission window should open based on presence or motion within video, and the like).

At step 611, the one or more computing devices may receive data indicating one or more monitoring options. The data may be based on user interactions with the user interface. These user interactions allow the user to select or otherwise input the one or more monitoring options. The data indicating one or more monitoring options may form a basis for establishing the monitoring of an A/V collection device. For example, as a result of user interactions with the user interface, the data may, as a non-exhaustive list, include one or more of the following: an indication that a device having the first network address is an A/V collection device, an indication that a device having the second network address is a monitoring device, an indication that the A/V collection device is an Echo Dot from Amazon, an indication that Amazon is an authorized destination, an indication that the trigger word or phrase is "Alexa", an indication that the monitoring device is an XR11 remote control from Comcast, an indication that the monitoring device should monitor audio, an indication that the transmission window should remain open for 10 seconds, and an indication that the transmission window should open based on occurrence of the trigger word or phrase within audio.

At step 613, the one or more computing devices may determine one or more monitoring parameters for the monitoring device. The one or more monitoring parameters may indicate criteria for use by the monitoring device when performing a monitoring procedure associated with the A/V collection device. The one or more monitoring parameters may be determined based on the data received at step 611. For example, the data received at step 611 may be analyzed to determine which types of parameters to include and to determine values for each determined type parameter. As one or more examples of the types of parameters that may be included, the one or more monitoring parameters may include, based on an analysis of the data, a parameter indicating a monitored type of data (e.g., a parameter having a value indicating audio, video or both). The one or more monitoring parameters may include, based on an analysis of the data, a parameter indicating a trigger event for the monitored type (e.g., a parameter having a value indicating a trigger word or phrase of "Alexa", a parameter having a value indicating detected human presence or detected human motion). The one or more monitoring parameters may include a parameter indicating when to report (e.g., a parameter having a value indicating that the monitoring device is to report based on each occurrence of the trigger event, or is to report if the trigger event has occurred and if the monitoring device has not reported within the last 10 seconds). The one or more monitoring parameters may include a parameter indicating a type of data to report (e.g., audio data, video data, image data, or an indication that the trigger event has occurred).

At step 617, the one or more computing devices may transmit, to the monitoring device, the one or more monitoring parameters. This transmission may be performed using the second network address or using some other communication technology (e.g., Bluetooth or ZigBee). Transmission of the one or more monitoring parameters may cause the monitoring device to configure, based on the one or more monitoring parameters, a monitoring procedure.

At step 619, the one or more computing devices may receive, from the monitoring device, an indication that the monitoring device is configured. The indication may have been transmitted by the monitoring device based on successfully configuring the monitoring procedure.

At step 621, the one or more computing devices may determine a monitoring profile. A monitoring profile may be associated with a particular A/V collection device. Thus, determining a monitoring profile may include generating a new monitoring profile or updating an existing monitoring profile. For example, a new monitoring profile may be generated if a profile for the A/V collection device is not stored in a profile database. An existing monitoring profile may be updated if a profile for the A/V collection device is stored in a profile database.

A monitoring profile may be used by the one or more computing device to determine whether to route or block a data transmission. Further, a monitoring profile may include information that indicates a status of the various trigger events (e.g., an indication of whether the trigger word or phrase has occurred), information that indicates a status of the various enforcement mechanisms (e.g., an indication of whether a transmission window is open or closed), and any other information associated with an A/V collection device or a monitoring device (e.g., an indication that a monitoring device is associated with the A/V collection device). Accordingly, a monitoring profile may include any information received and/or determined in connection with steps 601-619. For example, the monitoring profile may include one or more of the following: an address or identifier of the A/V collection device (e.g., the first network address or a Bluetooth address for the A/V collection device); an address or identifier of the monitoring device (e.g., the second network address or a Bluetooth address for the monitoring device); a copy of or information based on the one or more monitoring parameters (discussed at steps 513 and 517); and a copy of or information based on the data indicating one or more monitoring options (discussed at step 511).

The following table provides a non-exhaustive listing of example data included in a monitoring profile.

TABLE 3

| Example Data Included in a Monitoring Profile | Example Value |
|---|---|
| A network address or other network identifier for the A/V collection device. | An IP address for an Echo Dot by Amazon. |
| A network address or other network identifier for a monitoring device associated with the A/V collection device | A ZigBee network address for an XR11 remote control that is acting as a monitoring device |
| One or more destination device indications associated with the A/V collection device | One or more IP addresses of one or more servers associated with Amazon and to which the Echo Dot will attempt a data transmission; a domain name associated with Amazon; or one or more network portions of an IP address associated with Amazon |
| An indication of a transmission window status for the A/V collection device | An indication of whether the transmission window for the A/V collection device is open or closed |
| An indication of a period of time associated with the transmission window | An indication that the transmission window will remain open for 10 seconds after the transmission window transitions between being closed to being open |
| An indication of a transmission window timestamp | An indication of the most recent time at which the transmission window was opened |
| One or more trigger event indications that indicate which trigger events must occur to open the transmission window | An indication that a trigger word or phrase for the Echo Dot is "Alexa"; an indication of detected human presence; or an indication of detected human motion |
| One or more indications that associate each trigger event to a monitored type | An indication that the trigger word or phrase is associated with audio; an indication that the detected human presence is associated with video |
| One or more trigger event occurrence indications that indicate whether a trigger event has or has not occurred | An indication that the trigger word or phrase has occurred; an indication that human presence was detected; an indication that human motion was detected |

TABLE 3-continued

| Example Data Included in a Monitoring Profile | Example Value |
|---|---|
| An indication of data encryption | An indication of whether data of a data transmission from the Echo Dot is to be encrypted |

The various pieces of data of the monitoring profile may be set to default values upon generation of the monitoring profile. For example, a transmission window size indication may have a default value that indicates the transmission window is closed. A trigger event occurrence indication may have a default value that indicates the trigger event has not occurred. Further, the monitoring profile may be determined based on a template that includes various pieces of information that should be included and/or one or more default values.

At step 623, the one or more computing devices may store the monitoring profile. The monitoring profile may be stored in a profile database. The profile data may be local to the one or more computing devices (e.g., a hard drive storage device physically connected to the one or more computing devices) or may be network-based (e.g., a storage device located at local office 402 of FIG. 4). The profile database may index the monitoring profile may be indexed to enable searching and/or retrieval of any monitoring profile. For example, the profile database may be searched using an address or identifier of a monitoring device and, as a response, any monitoring profile that includes the address or the identifier may be retrieved. The profile database may be searched using an address or identifier of an A/V collection device and, as a response, any monitoring profile that includes the address or the identifier may be retrieved.

At step 625, the one or more computing devices may initiate a monitoring test. Initiating the monitoring test may include, for example, generating a user interface that instructs the user to speak the trigger word phrase and/or a command for the A/V collection device. The user interface may further instruct the user to walk around the room as the trigger word or phrase and/or the command is spoken.

At step 627, the one or more computing devices may determine whether data has been received from both the A/V collection device and the monitoring device. As the user performs the tasks instructed at step 625, the performance of those tasks may cause both the A/V collection device and the monitoring device to transmit data to the one or more computing devices. For example, the monitoring device may transmit reporting data that includes an indication that the trigger word or phrase has occurred within audio; and the A/V collection device may transmit a data transmission based on the command (e.g., a request for a stream of music from Amazon.com). The one or more computing devices may, as part of the determination of step 627, wait for an amount of time (e.g., 15 seconds) and monitor any data traffic received during that time. If the reporting data was received from the monitoring device and if the data transmission was received from the A/V collection device, the one or more computing devices may proceed to step 629. Otherwise, the method may proceed to step 628.

At step 628, the one or more computing devices may generate an indication that monitoring is not established. This may include generating a user interface to indicate there was an error in the monitoring test and instructing the user to re-enter the monitoring options and to re-set up the A/V collection device. From here, the method may proceed back to step 609 to allow the user to re-enter the monitor options.

At step 629, the one or more computing devices may generate an indication that monitoring is established. This may include generating a user interface to indicate the monitoring test was successful. The user interface may also indicate one or more conditions under which a data transmission from the A/V collection device will be routed or blocked (e.g., "Your Echo Dot will only transmit from your home within a ten-second window of the trigger word 'Alexa'"). From here, the method may end.

For simplicity, the steps of FIG. 6A were discussed in terms of examples involving a single A/V collection device and a single monitoring device. However, similar steps could be performed or repeated for examples involving two or more A/V collection devices and/or two or more monitoring devices. For example, if the user, in connection with steps 609 and 611, indicated that there are two or more monitoring devices, monitoring parameters may be determined for and transmitted to each of the two or more monitoring devices. Further, the monitoring profile (e.g., as discussed in connection with steps 621 and 623) for a A/V collection device may be generated and/or updated to include information associated with each of the two or more monitoring devices. As another example, if the user, in connection with steps 609 and 611, indicated there are two or more A/V collection devices, a similar series of steps as shown in FIG. 6A may be performed for each of the two or more A/V collection devices. In this manner, a monitoring profile for each of the two or more A/V collection devices may be determined and stored.

FIG. 6B shows one or more example methods that relate to a process where an A/V collection device may communicate one or more transmission parameters that are used as a basis for establishing the monitoring of the A/V collection device. The one or more example methods of FIG. 6B may be suitable for use by a gateway device. Because it may be possible to include one or more computing devices that collectively perform the aspects related to the gateway device, the steps of FIG. 6B will be discussed as being performed by one or more computing devices. Further, to facilitate the communication of the one or more transmission parameters, the A/V collection device and the gateway device may each implement an application programming interface (API) that is configured to request and transmit the one or more transmission parameters.

At step 651, one or more computing devices may transmit, to an A/V collection device, a first network address. This transmission may be performed based on an earlier request by the A/V collection device to join a network (e.g., network 310 of FIG. 3) or an earlier request by the A/V collection device for assignment of a network address. The first network address, for example, may be an IP address assigned to the A/V collection device for communicating via the network.

At step 653, the one or more computing devices may transmit, to a monitoring device, a second network address.

This transmission may be performed based on an earlier request by the monitoring device to join a network (e.g., network 310 of FIG. 3) or an earlier request by the monitoring device for assignment of a network address. The second network address, for example, may be an IP address assigned to the monitoring device for communicating via the network, or may be an address assigned to the monitoring device for communicating with a ZigBee network.

The example provided by steps 651 and 653 indicate that the one or more computing devices communicate with an A/V collection device and a monitoring device via an IP network or a ZigBee network. However, different communication technologies could be used. For example, the one or more computing devices may communicate with the A/V collection device and/or the monitoring device via Bluetooth. If communicating via Bluetooth, the one or more computing devices may transmit data as part of a pairing process with the A/V collection device or the monitoring device. Further, the one or more computing devices may communicate with the A/V collection device (e.g., via an IP network) differently from the manner in which the one or more computing devices communicate with the monitoring device (e.g., via Bluetooth or ZigBee).

At step 655, the one or more computing devices may receive, from the A/V collection device, a request to configure network access. This request may have been transmitted by the A/V collection device based on receipt of the first network address.

At step 657, the one or more computing devices may transmit, to the A/V collection device, a request for one or more data transmission parameters. The request may indicate particular types of data transmissions parameters that are being requested. Alternatively, the request may take the form of a general request that allows the A/V collection device to respond with a predetermined set of data transmission parameters. The types of data transmission parameters will be discussed in connection with step 659.

At step 659, the one or more computing devices may receive, from the A/V collection device, the one or more data transmission parameters. The one or more data transmission parameters may include various characteristics of the data transmissions that the A/V collection device may perform. Further, the one or more data transmission parameters may be used a basis for establishing the monitoring of the A/V collection device. As a non-exhaustive list of examples, the one or more data transmission parameters may include a parameter indicating a type of the A/V collection device (e.g., indicating that the A/V collection device is a product from the Echo line produced by Amazon, indicating that the A/V collection device is a product implementing Alexa from Amazon, indicating that the A/V collection device is a product implementing Siri from Apple, indicating that the A/V collection device is a product implementing Google Assistant from Google, indicating that the A/V collection device is a HomePod from Apple, indicating that the A/V collection device is an XR18 from Comcast, or the like). The one or more data transmission parameters may include a parameter indicating a trigger word or phrase associated with the A/V collection device (e.g., indicating that the A/V collection device is triggered by the phrase "OK Google", "Hey Siri", "Alexa", or some other word or phrase). The one or more data transmission parameters may include a parameter indicating one or more destinations that the A/V collection device transmits to (e.g., one or more IP addresses and/or domain names). The one or more data transmission parameters may include one or more encryption/decryption keys for encrypting or decrypting a data transmission from the A/V collection device.

At step 661, the one or more computing devices may determine one or more monitoring devices. This determination may be based on an inventory of devices in communication with the one or more computing devices. The inventory may include devices that are capable of performing as a monitoring device. For example, the one or more computing devices may include a listing of available security sensors (e.g., as shown in the example operating environment of FIG. 4) and a listing of other devices in the premises that have a video camera or microphone (e.g., user devices of FIG. 1 and/or monitoring device 307 of FIG. 3). This determination may further be based on settings that associate certain types of devices in the inventory to certain types of A/V collection devices. For example, an XR18 may be associated with a XR11, while an Amazon Echo Dot may be associated with an XR11 and a video camera. These settings may be cross-referenced against the inventory to determine which devices will be selected as the one or more monitoring devices. The inventory or settings may be established by an operator of the information distribution network (e.g., network 109 of FIG. 1) and/or by a user (e.g., user 301 of FIG. 3).

At step 663, the one or more computing devices may determine, for each of the one or more monitoring devices, one or more monitoring parameters. The one or more monitoring parameters may indicate criteria for use by a monitoring device when performing a monitoring procedure associated with the A/V collection device. The one or more monitoring parameters may be determined based on the one or more data transmission parameters received at step 659, the one or more monitoring devices determined at 661, and additional settings that provide default criteria for monitoring A/V collection devices. For example, the one or more monitoring parameters may include a parameter indicating a monitored type of data (e.g., a parameter having a value indicating audio, video or both). The one or more monitoring parameters may include a parameter indicating a trigger event for the monitored type (e.g., a parameter having a value indicating a trigger word or phrase of "Alexa", a parameter having a value indicating detected human presence or detected human motion). The one or more monitoring parameters may include a parameter indicating when to report (e.g., a parameter having a value indicating that a monitoring device is to report based on each occurrence of the trigger event, or is to report if the trigger event has occurred and if the monitoring device has not reported within the last 10 seconds). The one or more monitoring parameters may include a parameter indicating a type of data to report (e.g., audio data, video data, image data, or an indication that the trigger event has occurred).

At step 665, the one or more computing devices may transmit, to each of the one or more monitoring devices, the one or more monitoring parameters. This transmission may be performed using one or more communication technologies (e.g., using IP, Bluetooth or ZigBee). Transmission of one or more monitoring parameters to a monitoring device may cause the monitoring device to configure, based on the one or more monitoring parameters, a monitoring procedure.

At step 667, the one or more computing devices may receive one or more indications that the one or more monitoring devices are configured. Each of the one or more indications may have been transmitted by one of the one or more monitoring devices based on successfully configuring the monitoring procedure.

At step 669, the one or more computing devices may determine a monitoring profile. The monitoring profile may be associated with the A/V collection device. Thus, determining a monitoring profile may include generating a new monitoring profile or updating an existing monitoring profile. For example, a new monitoring profile may be generated if a monitoring profile for the A/V collection device is not stored in a profile database. An existing monitoring profile may be updated if a profile for the A/V collection device is stored in a profile database.

A monitoring profile may be used by a gateway device to determine whether to route or block a data transmission. Further, a monitoring profile may include information that indicates a status of the various trigger events (e.g., an indication of whether the trigger word or phrase has occurred), information that indicates a status of the various enforcement mechanisms (e.g., an indication of whether a transmission window is open or closed), and any other information associated with an A/V collection device or a monitoring device (e.g., an indication that the monitoring device 507 is associated with the A/V collection device 503). Thus, a monitoring profile may include any information received, determined and/or analyzed in connection with steps 651-667. For example, the monitoring profile may include one or more of the following: an address or identifier of the A/V collection device (e.g., the first network address or a Bluetooth address for the A/V collection device); an address or identifier of a monitoring device (e.g., the second network address or a Bluetooth address for a monitoring device); a copy of or information based on the one or more monitoring parameters (discussed at steps 663 and 665); and a copy of or information based on the one or more data transmission parameters (discussed at step 659).

The monitoring profile may include any of the data discussed above in connection with step 621 and/or Table 3. The following table provides a non-exhaustive listing of example data that may be included in a monitoring profile.

TABLE 4

| Example Data Included in a Monitoring Profile | Example Value |
| --- | --- |
| One or more encryption keys that are used to encrypt data of a data transmission from the A/V collection device | A public encryption key for an asymmetric cryptographic algorithm, such as RSA |
| One or more decryption keys for decrypting a data transmission from the A/V collection device | A private decryption key for an asymmetric cryptographic algorithm, such as RSA |

The various pieces of data of the monitoring profile may be set to default values upon generation of the monitoring profile. For example, a transmission window size indication may have a default value that indicates the transmission window is closed. A trigger event occurrence indication may have a default value that indicates the trigger event has not occurred. Further, the monitoring profile may be determined based on a template that includes various pieces of information that should be included and/or one or more default values.

At step 671, the one or more computing devices may store the monitoring profile. The monitoring profile may be stored in a profile database. The profile data may be local to the one or more computing devices (e.g., a hard drive storage device physically connected to the one or more computing devices) or may be network-based (e.g., a storage device located at local office 402 of FIG. 4). The profile database may index the monitoring profile may be indexed to enable searching and/or retrieval of any monitoring profile.

At step 673, the one or more computing devices may initiate a monitoring test. Initiating the monitoring test may include, for example, transmitting a request to perform a monitoring test to the A/V collection device and each of the one or more monitoring devices. The request to the A/V collection device may include a test data transmission that the A/V collection device is to attempt. The request to each of the one or more monitoring devices may include test data for processing in accordance with the configured monitoring procedure (e.g., audio data that includes a spoken occurrence of the trigger word or phrase).

At step 675, the one or more computing devices may determine whether data has been received from the A/V collection device and each of the one or more monitoring devices. Based on the requests transmitted at step 673, the A/V collection device and each monitoring device may transmit data to the one or more computing devices. For example, a monitoring device may transmit reporting data that indicates the trigger word or phrase occurred; and the A/V collection device may transmit the test data transmission. The one or more computing devices may, as part of the determination of step 675, wait for an amount of time (e.g., 15 seconds) and monitor any data traffic received during that time. If the reporting data was received from the monitoring device and if the test data transmission was received from the A/V collection device, the one or more computing devices may proceed to step 677. Otherwise, the method may proceed to step 676.

At step 676, the one or more computing devices may transmit, to the A/V collection device, an indication that configuration is not complete. This indication may represent a response to the request received at step 655. From here, the method may proceed back to step 609 and wait until the A/V collection device re-transmits a request to configure network access.

At step 677, the one or more computing devices may transmit, to the A/V collection device, an indication that configuration is complete. This indication may represent a response to the request received at step 655. From here, the method may end.

Figure 5A:
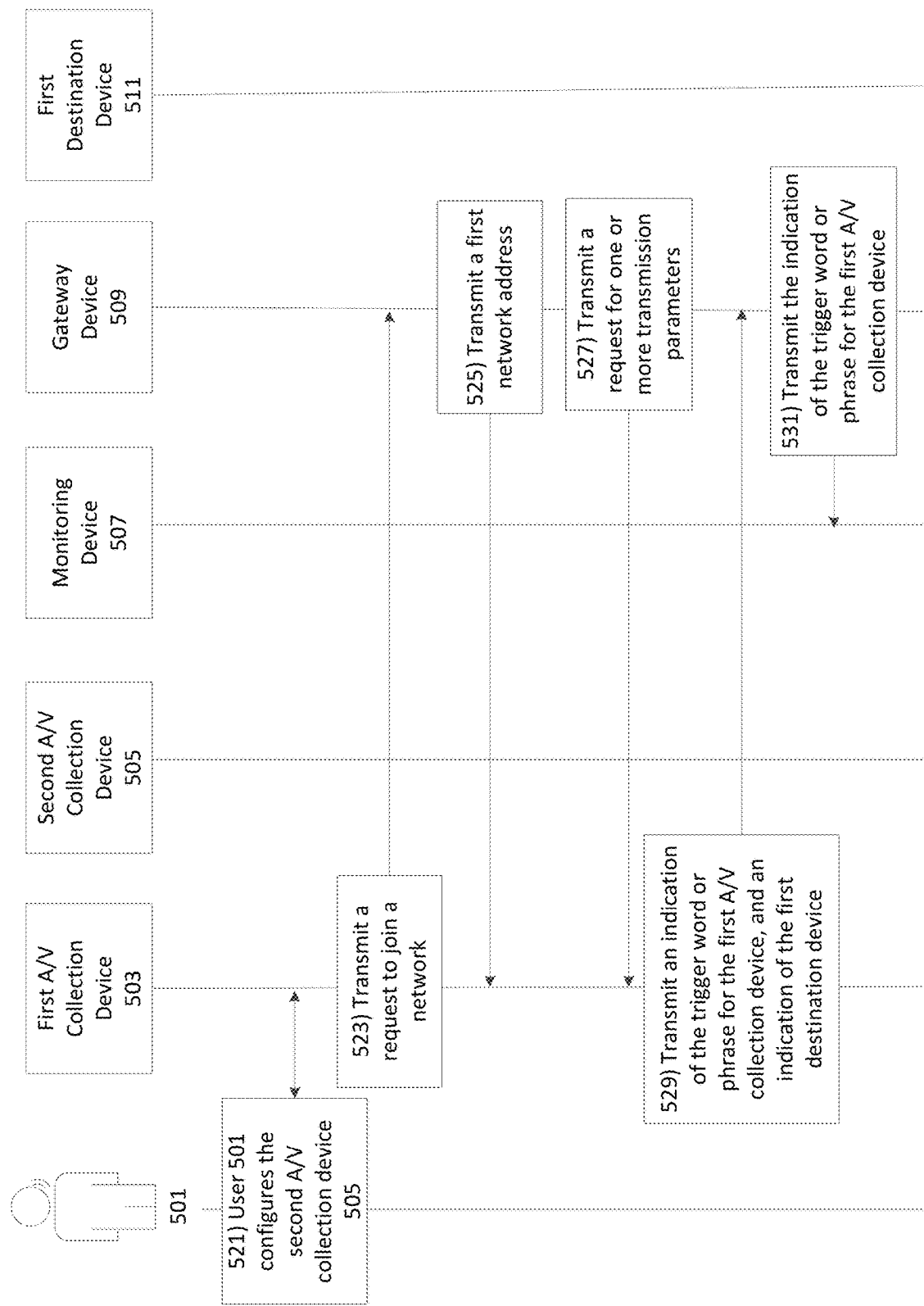
FIGS. 5A-5E show one or more example flows that includes the monitoring of one or more A/V collection devices.
Figure 5B:
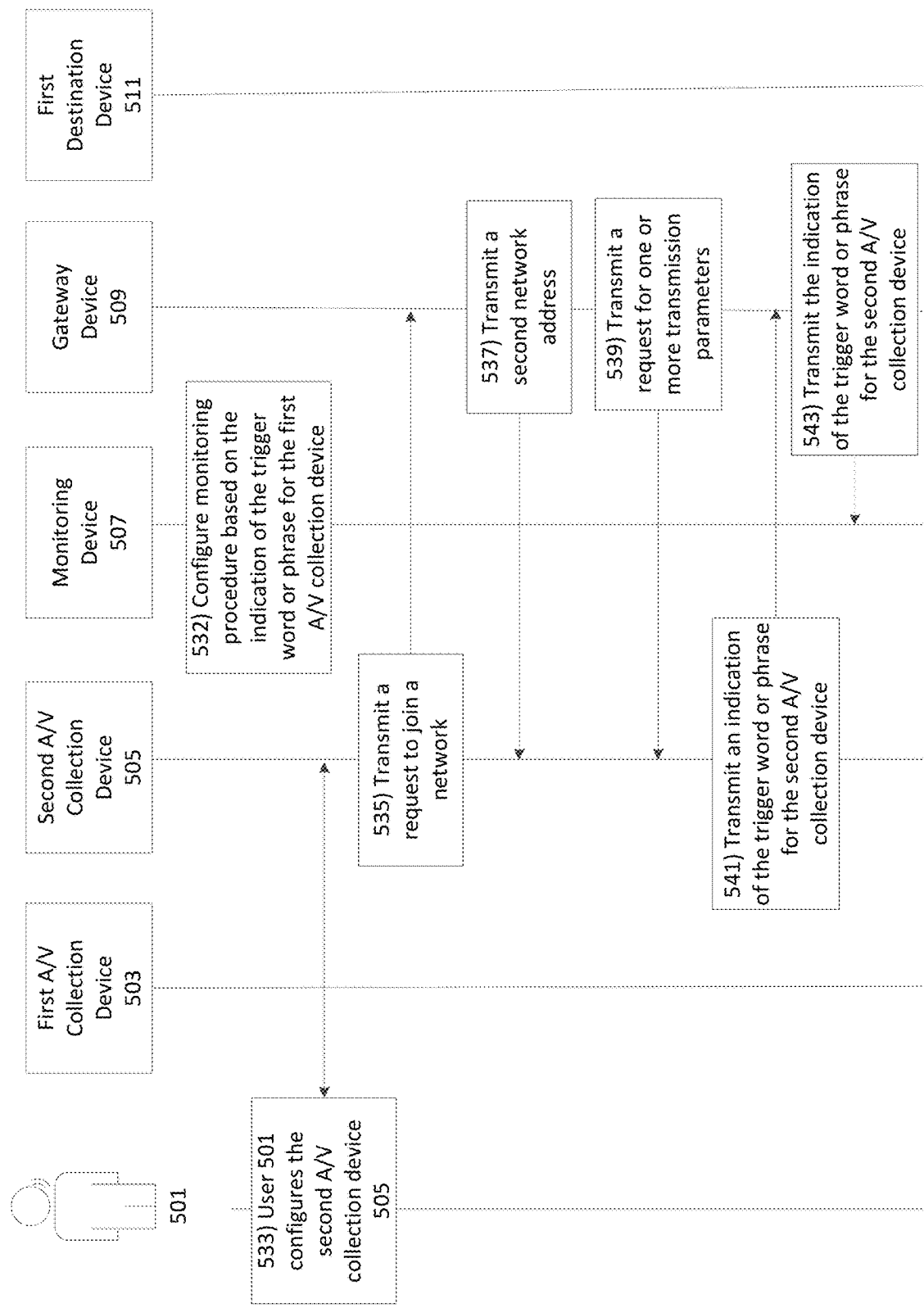
Figure 5C:
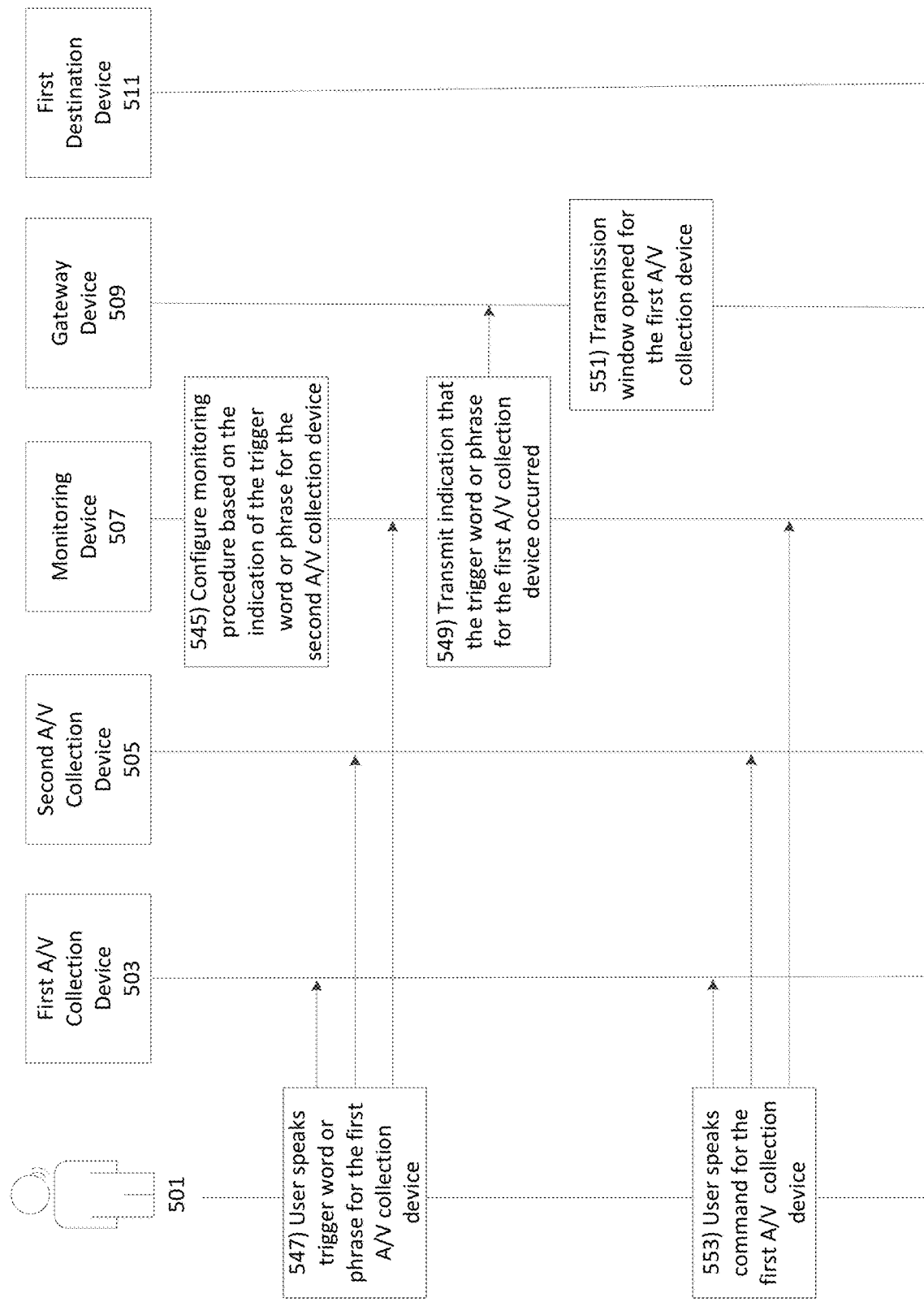
Figure 5D:
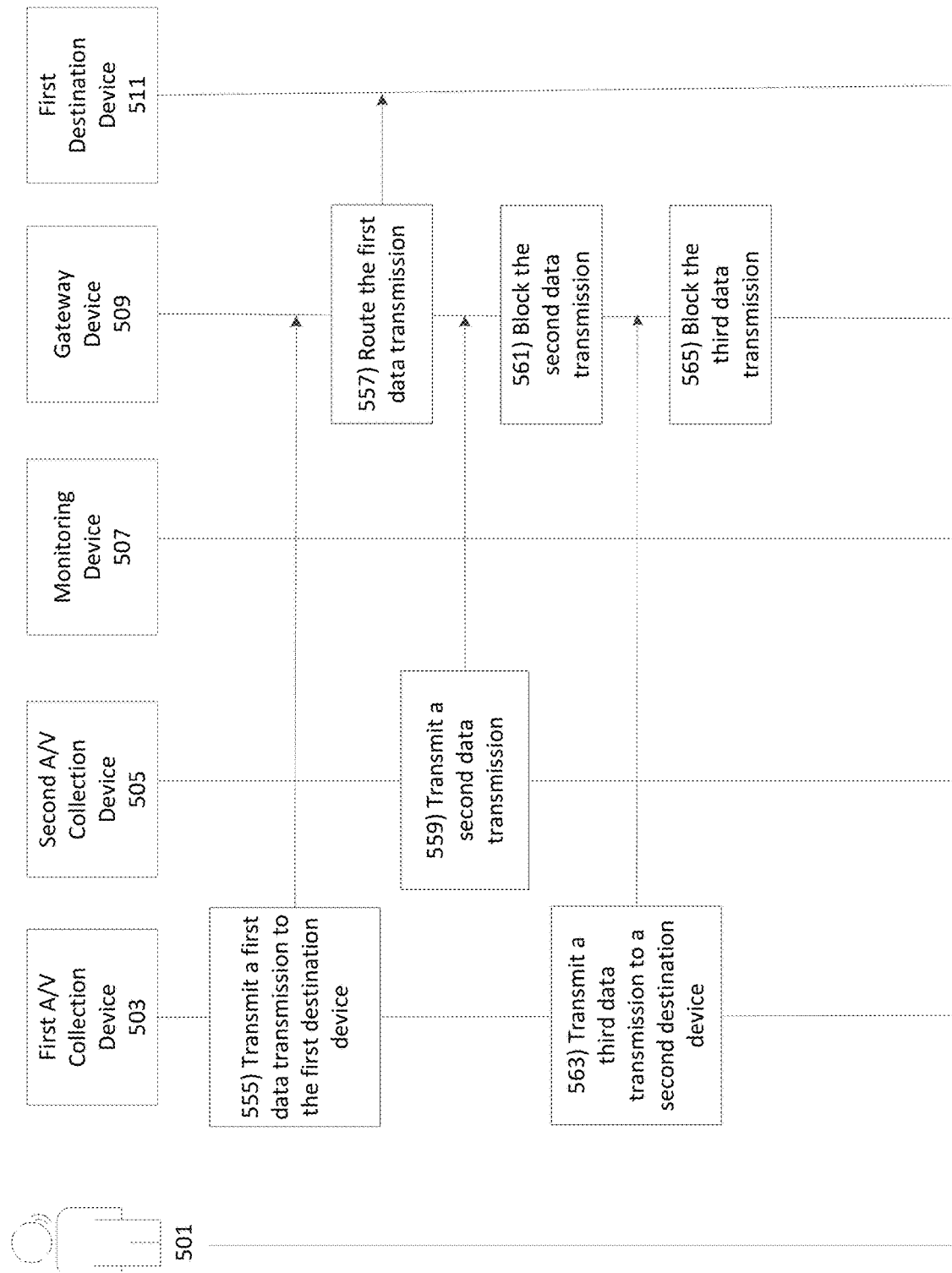
Figure 5E:
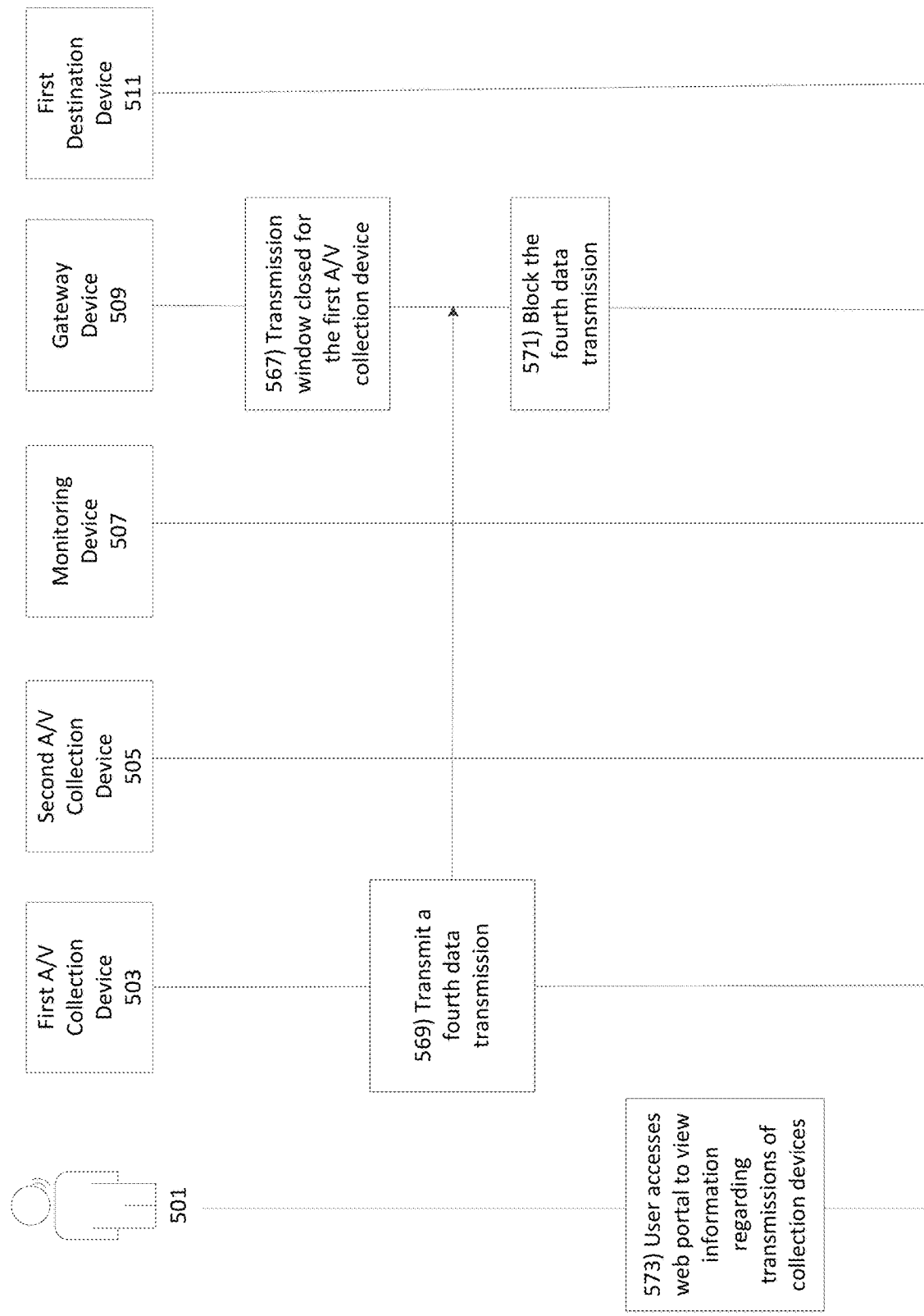

For simplicity, the steps of FIG. 6B were discussed in terms of examples that involved a single A/V collection device. However, similar steps could be performed or repeated for examples involving two or more A/V collection devices. For example, if requests to configure network access were received from two or more A/V collection devices, a similar series of steps as shown in FIG. 5B may be performed for each of the two or more A/V collection devices, which may result in the determination and storage of a monitoring profile for each of the two or more A/V collection devices.

The example methods of FIGS. 6A and 6B show one or more examples of various ways in which the monitoring of an A/V collection device could be established. Indeed, various modifications could be performed to the example methods shown in FIGS. 6A and 6B. For example, steps 605-611 of FIG. 6A may be performed prior to step 661 of FIG. 6B and step 661 of FIG. 6B may be performed based on those steps. As another example, steps 655-677 of FIG. 6B may replace steps 627-629 of FIG. 6A.

Figure 7:
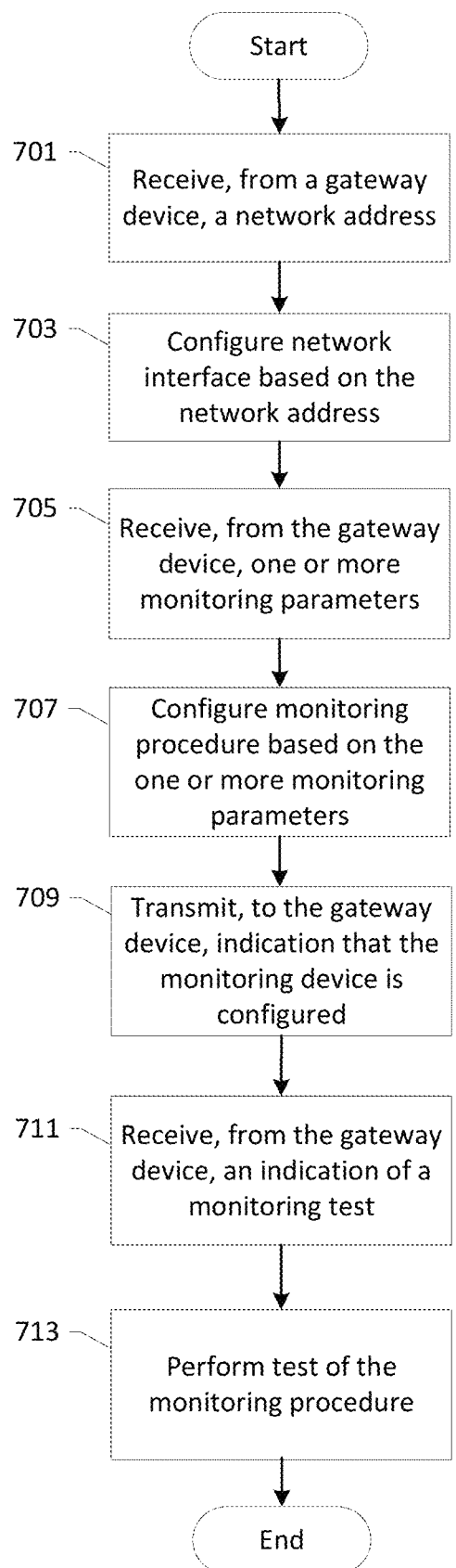
FIG. 7 shows one or more example methods for configuring a monitoring device to perform a monitoring procedure associated with an A/V collection device.

FIG. 7 shows one or more example methods for configuring a monitoring device to perform a monitoring procedure associated with an A/V collection device.

At step 701, the monitoring device may receive, from a gateway device, a network address. The network address may have been transmitted at step 603 of FIG. 6A or step 653 of FIG. 6B. The network address may include, for example, an IP address or a ZigBee address.

At step 703, the monitoring device may configure, based on the network address, configure a network interface. For example, if the network address includes an IP address, the monitoring device may configure an IP network interface to enable transmissions via an IP network using the IP address. If the network address includes a ZigBee address, the monitoring device may configure a ZigBee network interface (e.g., by updating a network information table and/or a Media Access Control (MAC) information table) to enable transmissions via a ZigBee network using the ZigBee address.

The one or more examples provided by steps 701 and 703 indicate that the monitoring device may communicate with a gateway device via an IP network or a ZigBee network. However, different communication technologies could be used. For example, the monitoring device may communicate with the gateway device via Bluetooth. Instead of transmitting a network address and configuring a network interface based on the network address, the monitoring device may receive, as part of a pairing process with the gateway device, data; may complete the pairing process; and may store the security keys and other data for transmitting to the gateway device via a Bluetooth connection.

At step 705, the monitoring device may receive, from the gateway device, one or more monitoring parameters. The one or more monitoring parameters may have been transmitted at step 617 of FIG. 6A or step 665 of FIG. 6B.

At step 707, the monitoring device may configure, based on the one or more monitoring parameters, a monitoring procedure. Configuring the monitoring procedure may include storing, generating or otherwise establishing one or more criteria that together enable the monitoring device to monitor for data associated with the A/V collection device and determine whether to report data to the gateway device. These criteria may be included in or otherwise based on the one or more monitoring parameters, which were transmitted from a gateway device. For example, in one or more instances, the one or more monitoring parameters may include a parameter indicating that a monitored type is audio; a parameter indicating that a trigger event is the trigger word "Alexa"; a parameter indicating that the monitoring device is to report based on each occurrence of the trigger event; and a parameter indicating that the monitoring device is to report an indication that the trigger event has occurred. Based on such monitoring parameters, the monitoring device may configure a monitoring procedure that monitors for audio data (e.g., monitor for audio generated based on a microphone of the monitoring device); that determines whether the trigger event of the word "Alexa" occurred within the audio; that determines to report to the gateway device based on each occurrence of the trigger word "Alexa"; and that, based on the determination to report, transmits, to the gateway device, an indication that the trigger word "Alexa" occurred. Example details of the monitoring procedure will be discussed in connection with FIG. 8.

At step 709, the monitoring device may transmit, to the gateway device, an indication that the monitoring device is configured. At step 711, the monitoring device may receive, from the gateway device, an indication of a monitoring test. This indication may have been transmitted by the gateway device at step 673 of FIG. 6B.

At step 713, the monitoring device may perform a test of the monitoring procedure. The indication received at step 711 may include test audio that can be processed via the monitoring procedure. Accordingly, to test the monitoring procedure, the monitoring device may process the test audio using a process similar to the steps shown in FIG. 8 (discussed below). For example, the test audio may include audio of a spoken word "Alexa". The test of the monitoring procedure may perform an audio recognition process on the test audio, determine that the trigger word "Alexa" has occurred in the test audio, determine to report data to the gateway device, and transmit, to the gateway device, an indication that the trigger word "Alexa" has occurred.

Figure 8:
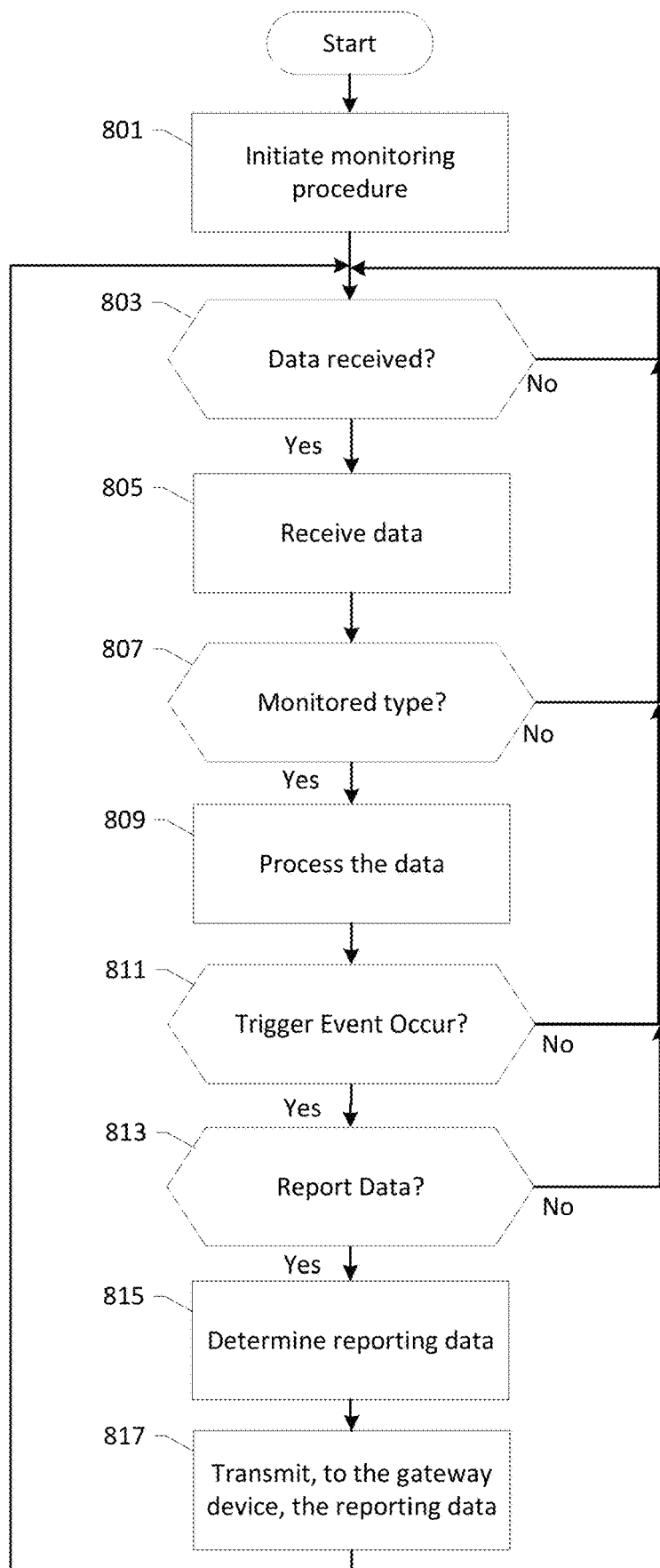
FIG. 8 shows one or more example methods that relate to performing a monitoring procedure at a monitoring device.
Figure 9A:
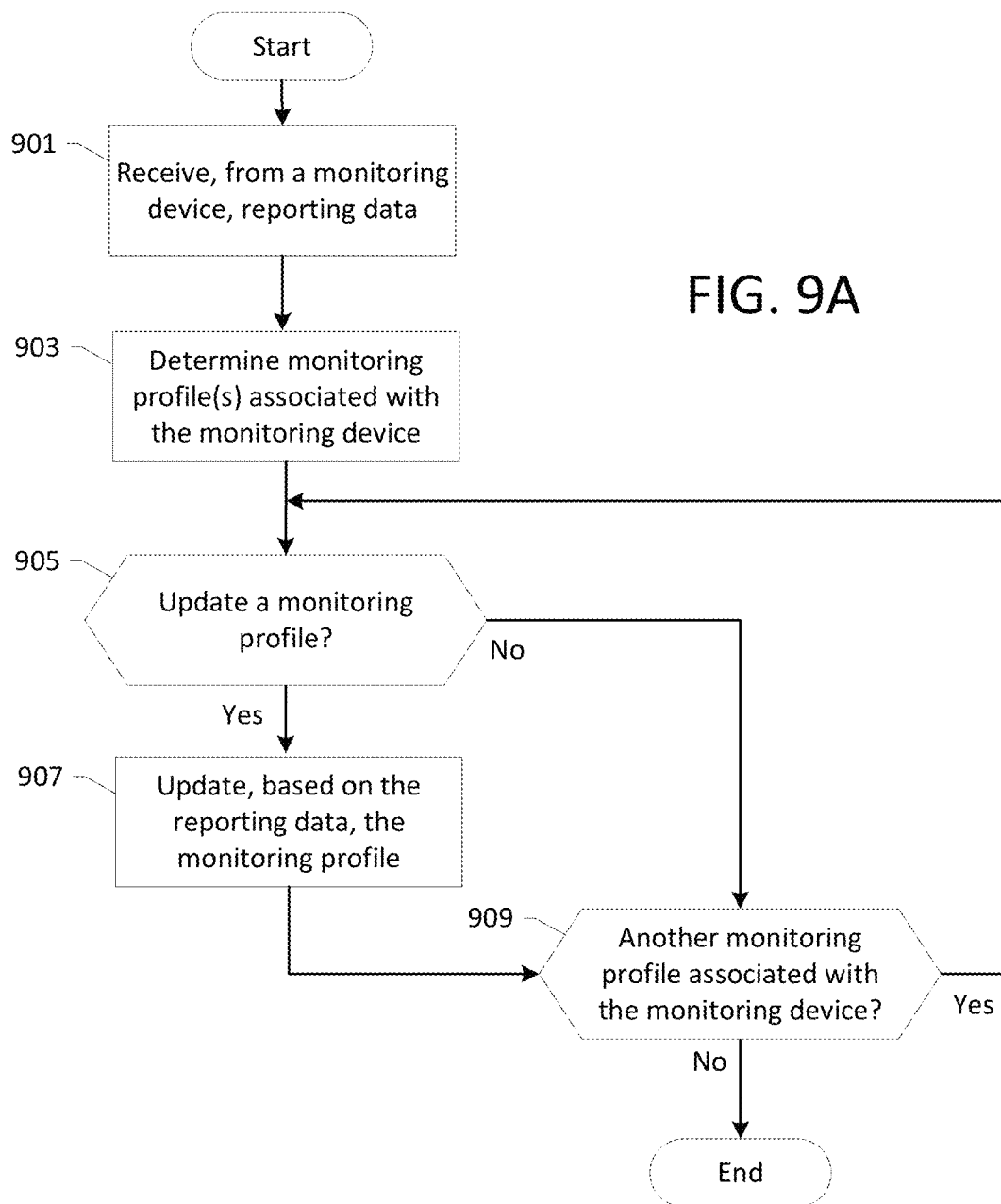
FIG. 9A shows one or more example methods that may be performed based on the gateway device receiving reporting data from a monitoring device.

Based on the example methods of FIGS. 6A, 6B and 7, monitoring of one or more A/V collection devices may be established. FIGS. 8, 9A and 9B show example methods for monitoring of one or more A/V collection devices and determining whether a data transmission from an A/V collection device should be routed or blocked.

FIG. 8 shows one or more example methods that relate to performing a monitoring procedure at a monitoring device. The steps of FIG. 8 show example steps for performing the monitoring procedure configured at step 707 of FIG. 7.

At step 801, the monitoring device may initiate a monitoring procedure. The monitoring procedure may be initiated after the monitoring device performs a monitoring test (e.g., step 713 of FIG. 7) or after the monitoring device configures the monitoring procedure (e.g., step 707 of FIG. 7).

At step 803, the monitoring device may determine whether data has been received. The monitoring device may include various sensors (e.g., a microphone, video sensor, image sensor, or the like) and the monitoring device may check for new data generated by or otherwise received from the sensors. If new data has been generated by or otherwise received from a sensor, the method may proceed to step 805. Otherwise, the method may repeat step 803 to continue waiting until data has been received.

At step 805, the monitoring device may receive data for processing. This data may be received from one of the sensors or retrieved from a location where the sensors store data (e.g., a buffer or queue).

At step 807, the monitoring device may determine whether the data is formatted as a monitored type. This determination may be based on a condition or criterion that establishes, for the monitoring procedure, one or more monitored types (e.g., as configured at step 707 of FIG. 7). For example, if a monitored type is audio, the monitoring device may determine whether the data received at step 805 is formatted as audio. If the data is formatted as audio (e.g., formatted according to a version of Waveform Audi File Format (WAV)), the method may proceed to step 809. Similarly, if a monitored type is video, the monitoring device may determine whether the data received at step 805 is formatted as video. If the data is formatted as video (e.g., formatted according to a version of Moving Picture Experts Group (MPEG)), the method may proceed to step 809. If a monitored type is an image, the monitoring device may determine whether the data received at step 805 is formatted as an image (e.g., formatted according to a version of Joint Photographic Experts Group (JPEG)). If the data is formatted as an image, the method may proceed to step 809. If the data is not formatted as a monitored type, the method may proceed back to step 803 to wait for new data to be received.

At step 809, the monitoring device may process the data. The various processes performed on the data may be based on criteria that establish, for the monitoring procedure, one or more trigger events and one or more monitored types (e.g., as configured at step 707 of FIG. 7). For example, if a trigger event is a trigger word or phrase and a monitored type is audio, the monitored device may perform one or more audio recognition processes to recognize or otherwise determine one or more words or phrases spoken in the audio. For example, if a trigger event is detection of human presence or detection of human movement and a monitored type is an image or video, the monitored device may perform one or more image or video recognition processes to recognize or otherwise determine one or more objects or entities present or moving in the image or video.

At step 811, the monitoring device may determine whether a trigger event has occurred. This determination may be based on a condition or criterion that establishes, for the monitoring procedure, one or more trigger events (e.g., as configured at step 707 of FIG. 7). For example, if a trigger event is a trigger word or phrase, the monitored device may determine whether any of the words or phrases spoken in the audio match the trigger word or phrase (e.g., determine whether "Alexa" was spoken in the audio). If any of the words or phrases spoken in the audio match the trigger word or phrase, the method may proceed to step 813. As another example, if a trigger event is detection of human presence or detection of human movement, the monitored device may determine whether any of the objects or entities present or moving in the image or video is a human. If one of the objects or entities present or moving in the image or video, the method may proceed to step 813. If the monitoring device determines that a trigger event occurred, it may store data related to the occurrence (e.g., a timestamp indicating when the even occurred, a copy of the data received at step 805). If the trigger event did not occur, the method may proceed to step 803 to wait for new data to be received.

At step 813, the monitoring device may determine whether to report data. This determination may be based on a criterion that establishes, for the monitoring procedure, when to report (e.g., as configured at step 707 of FIG. 7). For example, if the monitoring device is to report based on each occurrence of the trigger event, the method may proceed to step 815. If the monitoring device is to report if the trigger event has occurred and if the monitoring device has not reported within the last 10 seconds, the monitoring device may determine a timestamp of the most recent transmission of reporting data to the gateway device (e.g., retrieve the timestamp stored at step 817). If that timestamp is greater than seconds from the current time, the method may proceed to step 815. If the monitoring device determines not to report data, the method may proceed to step 803 to wait for new data to be received.

At step 815, the monitoring device may determine reporting data. This determination may be based on a criterion that establishes, for the monitoring procedure, what type of data to report (e.g., as configured at step 707 of FIG. 7). For example, if the monitoring device is to report audio data, video data or image data, the monitoring device may include the raw data received at step 805 as part of the reporting data. If the monitoring device is to report an indication that the trigger event has occurred, the monitoring device may determine an indication that a trigger event has occurred and include the indication as part of the reporting data. The reporting data may include specific information about the occurrence of the trigger event (e.g., the reporting data may include data indicating that "Alexa" was spoken in audio). The specific information may be provided via the indication that the trigger event has occurred (e.g., the reporting data may include an indication that the trigger word or phrase "Alexa" occurred) or may be provided by additional data (e.g., the reporting data may include an indication that a trigger event occurred and data indicating "Alexa" was spoken). The reporting data may include an address or identifier of the monitoring device (e.g., the network address received at step 801, or some other address or identifier). The reporting data may include the raw data received, at step 805, as part of the reporting data. The reporting data may include the raw data because steps 809 and 811 of FIG. 8 are not performed by the monitoring device. Instead, processes similar to steps 809 and 811 may be performed by the gateway device (e.g., after step 901 and prior to step 905 of FIG. 9A).

At step 817, the monitoring device may transmit, to the gateway device, the reporting data. The monitoring device may store a timestamp of the current time. This timestamp may indicate that the current time was the most recent transmission of reporting data to the gateway device.

FIG. 9A shows one or more example methods that may be performed based on the gateway device receiving reporting data from a monitoring device. Because it may be possible to include one or more computing devices that collectively perform the aspects related to the gateway device, the steps of FIG. 9A will be discussed as being performed by one or more computing devices. In general, the example methods of FIG. 9A provide one or more examples where the gateway device processes the reporting data to update one or more monitoring profiles. As described in connection with FIG. 9B, the data included by a monitoring profile may be used as a basis for determining whether to route or block a data transmission from an A/V collection device.

At step 901, one or more computing devices may receive, from a monitoring device, reporting data. The reporting data may have been transmitted by the monitoring device at step 817 of FIG. 8. The one or more computing devices may identify an address or identifier of the monitoring device that is included in the reporting data.

At step 903, the one or more computing devices may determine one or more monitoring profiles that are associated with the monitoring device. This determination may include searching the profile database using the address or identifier of the monitoring device. As a response to the search, the one or more monitoring profiles may be retrieved. The one or more monitoring profiles may include the address or identifier of the monitoring device.

The remaining steps of FIG. 9A (steps 905-909) show an example iterative process that may be repeated for each of the one or more monitoring devices. The iterative process may begin with a first of the one or more monitoring devices and may end after each of the one or more monitoring devices has been processed.

At step 905, the one or more computing devices may determine whether to update a monitoring profile. This determination may be performed based on the reporting data. For example, if the reporting data includes an indication that a trigger event occurred, the one or more computing devices may determine to update the monitoring profile. As another example, if the reporting data includes audio, video or an image, this determination may be performed based on an analysis of the audio, the video or the image (e.g., based on the one or more computing devices performing processes similar to steps 809 and 811 from FIG. 8). Indeed, if the A/V collection device is an Echo Dot from Amazon and if the reporting data includes audio, based on the audio, the one or more computing devices may determine, based on analyzing the audio, that the trigger word or phrase "Alexa" was spoke within the audio. Based on the occurrence of the trigger word or phrase, the one or more computing devices may determine to update the monitoring profile. If the trigger word or phrase did not occur in the audio, the one or more computing devices may determine not to update the monitoring profile. If the one or more computing devices determine to update the monitoring profile, the method may proceed to step 907. If the one or more computing devices determine not to update the monitoring profile, the method may proceed to step 909.

At step 907, the one or more computing devices may update the monitoring profile. The update may be based on the reporting data. Updating the monitoring profile may include updating, or storing, a value of one or more indications included in the monitoring profile. For example, the monitoring profile may be updated to change, or store, a value of a trigger event occurrence indication. A value may be changed, or stored, to indicate that the trigger event has occurred (e.g., indicate that the trigger word or phrase "Alexa" has occurred).

An update to the monitored profile may be performed based on any change to the monitoring profile that occurs during the updating process of step 907. For example, based on the change to trigger event occurrence indication, the one or more computing devices may search for any other trigger event occurrence indication in the monitoring profile. If other trigger event occurrence indications exist in the monitoring profile, a value of each other trigger event occurrence indication may be checked. If each has a value indicating that the trigger event has occurred, the one or more computing devices may update the monitoring profile to change, or store, the value of the transmission window status indication. A value of the transmission window status indication may be changed, or stored, to indicate that the transmission window is open. A value of the transmission window timestamp may be changed to the current time.

As one particular example, the monitoring profile may include trigger event occurrence indications for two trigger events: a trigger word or phrase, and detection of human presence. Accordingly, under this example, the monitoring profile may include a trigger event occurrence indication for the trigger word or phrase, and a trigger event occurrence indication for the detection of human presence. Based on the change to the trigger event indication for the trigger word or phrase, the trigger event occurrence indication for the detection of human presence may be checked to determine if the detection of human presence has occurred since the transmission window closed. If the detection of human presence has occurred, the one or more computing devices may change the value of the transmission window status indication to indicate that the transmission window is open and may change the value of the transmission window timestamp to the current time.

At step 909, the one or more computing devices may determine whether another monitoring profile is associated with the monitored device. This may be based on whether each of the one or more monitored profiles (e.g., as determined at step 903) has been processed via one or more of steps 905 or 907. If each of the one or more monitored profiles has been processed, the method may end. Otherwise, the method may proceed to step 905 to repeat the iterative process for the next monitored profile in the one or more monitored profiles.

FIG. 9B shows one or more example methods that may be performed based on the gateway device receiving a data transmission from an A/V collection device. Because it may be possible to include one or more computing devices that collectively perform the aspects related to the gateway device, the steps of FIG. 9A will be discussed as being performed by one or more computing devices. In general, the example methods of FIG. 9B provide one or more examples where the data included by a monitoring profile may be used as a basis for determining whether to route or block a data transmission received from an A/V collection device.

At step 951, one or more computing devices may receive, from an A/V collection device, a data transmission. This data transmission may have been transmitted from the A/V collection device based on a user speaking a trigger word or phrase ("Alexa") and subsequently speaking a command for the A/V collection device (e.g., "play a stream of classical music").

At step 953, the one or more computing devices may determine a monitoring profile associated with the A/V collection device. This determination may include searching the profile database using the address or identifier of the A/V collection device. As a response to the search, the monitoring profile may be retrieved. The monitoring profile may include the address or identifier of the monitoring device.

At step 955, the one or more computing devices may determine whether to route or block the data transmission. The determination of step 955 may be based on the data transmission and the monitoring profile. For example, the one or more computing devices may determine to route the data transmission based on a transmission window status indication of the monitoring profile having a value that indicates the transmission window is open. As another example, the data transmission may determine to route the data transmission based on an authorized destination indication having a value that matches or is similar to the address or network identifier of an intended destination device of the data transmission (e.g., an IP address of the intended destination device matches one of the IP addresses listed in the monitoring profile by an authorized destination indication; or a domain name associated with the intended destination device matches one of the domain names listed in the monitoring profile by an authorized destination indication). As yet another example, the monitoring profile may include an encryption indication that indicates the A/V collection device should be transmitting encrypted data, and the data transmission may be routed based on the data transmission being encrypted. As another example, one or more computing devices may determine to block the data transmission if the transmission window status indication has a value that indicates the transmission window is closed, if the address or network identifier of the intended destination device does not match any authorized destination indication of the monitoring profile, or if the data transmission is unencrypted or is unable to be decrypted. If the one or more computing devices determines to route the data transmission, the method may proceed to step 957, if the one or more computing devices determines to block the data transmission, the method may proceed to step 959.

At step 957, the one or more computing devices may route the data transmission. This may include transmitting the data transmission outside the premises via a WAN. The routing may cause the destination device to receive the data transmission. The one or more computing devices may store information related to the routing of the data transmission (e.g., a timestamp of the routing, a copy of the data transmission, etc.). The one or more computing devices may, prior to transmitting the data transmission outside the premises, re-encrypt the data transmission using the key(s) from the monitoring profile.

At step 959. The one or more computing devices may block the data transmission. This may include dropping or otherwise preventing the data transmission from being routed outside the premises to its intended destination device. The blocking may cause the intended destination device of the data transmission to not receive the data transmission. The one or more computing devices may store information related to the blocking of the data transmission (e.g., a timestamp of the blocking, a copy of the data transmission, etc.).

While the remaining steps of FIG. 9B (e.g., steps 961-969) are shown as occurring after steps 951-959, the remaining steps may be performed as a separate process. For example, steps 951-959 may be performed in a first thread, and steps 961-969 may be performed periodically in a second thread.

At step 961, the one or more computing devices may determine whether to update the monitoring profile. This determination may be performed based on the transmission window size indication and the transmission window timestamp included in the monitoring profile. For example, the one or more computing devices may compare the transmission size indication, the transmission window timestamp and the current time to determine whether the transmission window has expired. As a particular example, the transmission window timestamp may indicate a time that, as compared to the current time, is 11 seconds in the past. If the transmission window size indication indicates a size of 10 seconds, the transmission window has expired. If the transmission window size indication indicates a size of 15 seconds, the transmission window has not expired. If the transmission window has expired, the one or more computing devices may determine to update the monitoring profile. If the transmission window has not expired, the one or more computing devices may determine not to update the monitoring profile. If the one or more computing devices determine to update the monitoring profile, the method may proceed to step 963. If the one or more computing devices determine not to update the monitoring profile, the method may proceed to step 865.

At step 963, the one or more computing devices may update the monitoring profile. Updating the monitoring profile may include updating a value of one or more indications included in the monitoring profile. For example, the monitoring profile may be updated to change, or store, a value of transmission window status indication. A value may be changed, or stored, to indicate that the transmission window has closed. An update to the monitored profile may be performed based on any change to the monitoring profile that occurs during the updating process of step 963. For example, based on a change to or a storage of a transmission window status indication, the one or more computing devices may search for any trigger event occurrence indications in the monitoring profile. If trigger event occurrence indications exist in the monitoring profile, a value of each trigger event occurrence indication may be changed, or stored, to indicate that the trigger event has not occurred.

The monitoring profile, for example, may include trigger event occurrence indications for two trigger events: a trigger word or phrase, and detection of human presence. The monitoring profile may, for example, include a trigger event occurrence indication for the trigger word or phrase, and a trigger event occurrence indication for the detection of human presence. Based on the change to the transmission window status indication, the value for the trigger event occurrence indication for the trigger word or phrase may be changed to indicate the trigger word or phrase has not occurred, and the value for the trigger event occurrence indication for the detection of human presence may be changed to indicate the detection of human presence has not occurred.

At step 965, the one or more computing devices may determine whether to report to a user. This determination may be performed based on whether the data transmission was authorized, routed and/or blocked (e.g., information determined and/or stored at steps 955-959). If the one or more computing devices determines to report to a user, the method may proceed to step 967. Otherwise, the method may end.

At step 967, the one or more computing devices may determine user reporting data. This may include selecting various pieces of information for transmission and/or determining one or more statistics based on the routing or blocking of the data transmission and/or a reporting schedule (e.g., report once per day). For example the user reporting data may include one or more of the following: a copy of the data transmission, a timestamp of the routing, a timestamp of the blocking, indication that the data transmission was transmitted to an authorized destination device, and an indication that the data transmission was prevented from being transmitted to an unauthorized destination device. In some instances, the user reporting data may include information related to multiple data transmissions (e.g., information for one or more data transmissions that were attempted over the last 24 hours).

At step 969, the one or more computing devices may transmit the user reporting data. The user reporting data may be transmitted to a user device (e.g., mobile device 420 of FIG. 4;), a web portal server (server 418 of FIG. 4), or some other device (e.g., a device within local office 402 of FIG. 4; a server 105, 106 or 107 of FIG. 1).

The descriptions above are merely one or more example embodiments of various concepts. They may be rearranged/divided/combined as desired, and one or more components or steps may be added or removed without departing from the spirit of the present disclosure. The scope of this patent should only be determined by the claims that follow.

The invention claimed is:

1. A method comprising:
   receiving, by a first computing device, a first indication that a trigger event, associated with audio for a second computing device, has occurred;
   after the trigger event has occurred, receiving a second indication that a communication window associated with the audio is closed;
   receiving, by the first computing device, a data communication associated with the second computing device; and
   blocking, based on the second indication that the communication window associated with the audio is closed, the data communication.

2. The method of claim 1, wherein the receiving the first indication comprises receiving the first indication from a third computing device that detected the trigger event.

3. The method of claim 1, wherein the receiving the data communication comprises receiving the data communication from the second computing device.

4. The method of claim 1, wherein the blocking the data communication comprises at least one of:
   dropping the data communication,
   preventing the data communication from being routed outside a premises associated with the first computing device,
   preventing an intended destination device from receiving the data communication, or
   preventing the data communication from being routed from the first computing device.

5. The method of claim 1, further comprising:
sending a monitoring parameter to a third computing device to cause the third computing device to monitor the second computing device for the trigger event.

6. The method of claim 1, wherein the blocking the data communication comprises:
blocking the data communication further based on a monitoring profile associated with the second computing device.

7. The method of claim 1, wherein the first computing device comprises a gateway device, the second computing device comprises a voice assistant device, and the receiving the first indication comprises receiving the first indication from a remote control.

8. The method of claim 1, further comprising:
receiving a third indication that a second trigger event, associated with a second audio for the second computing device, has occurred;
after the second trigger event has occurred, receiving a fourth indication that a second communication window associated with the second audio is open;
receiving a second data communication associated with the second computing device; and
routing, based on the fourth indication that the second communication window associated with the second audio is open, the second data communication.

9. A method comprising:
receiving, by a first computing device, a first indication that a trigger event, associated with audio for a second computing device, has occurred;
after the trigger event has occurred, receiving a second indication that a communication window associated with the audio is open;
receiving, by the first computing device, a data communication associated with the second computing device; and
routing, based on the second indication that the communication window associated with the audio is open, the data communication.

10. The method of claim 9, wherein the receiving the first indication comprises receiving the first indication from a third computing device that detected the trigger event.

11. The method of claim 9, wherein the receiving the data communication comprises receiving the data communication from the second computing device.

12. The method of claim 9, wherein the routing the data communication comprises at least one of:
forwarding the data communication to a network outside a premises associated with the first computing device, or
causing an intended destination device to receive the data communication.

13. The method of claim 9, further comprising:
sending a monitoring parameter to a third computing device to cause the third computing device to monitor the second computing device for the trigger event.

14. The method of claim 9, wherein the first computing device comprises a gateway device, the second computing device comprises a voice assistant device, and the receiving the first indication comprises receiving the first indication from a remote control.

15. The method of claim 9, wherein the routing the data communication comprises:
routing the data communication further based on a monitoring profile associated with the second computing device.

16. An apparatus comprising:
one or more processors; and
memory storing instructions that, when executed by the one or more processors, cause the apparatus to:
receive a first indication that a trigger event, associated with audio for a first computing device, has occurred;
after the trigger event has occurred, receive a second indication that a communication window associated with the audio is closed;
receive a data communication associated with the first computing device; and
block, based on the second indication that the communication window associated with the audio is closed, the data communication.

17. The apparatus of claim 16, wherein the instructions, when executed by the one or more processors, cause the apparatus to receive the first indication by:
receiving the first indication from a second computing device that detected the trigger event.

18. The apparatus of claim 16, wherein the instructions, when executed by the one or more processors, cause the apparatus to receive the data communication by:
receiving the data communication from the first computing device.

19. The apparatus of claim 16, wherein the instructions, when executed by the one or more processors, cause the apparatus to block the data communication by at least one of:
dropping the data communication,
preventing the data communication from being routed outside a premises associated with the apparatus,
preventing an intended destination device from receiving the data communication, or
preventing the data communication from being routed from the apparatus.

20. The apparatus of claim 16, wherein the instructions, when executed by the one or more processors, further cause the apparatus to:
send a monitoring parameter to a second computing device to cause the second computing device to monitor the first computing device for the trigger event.

21. The apparatus of claim 16, wherein the instructions, when executed by the one or more processors, cause the apparatus to block the data communication by:
blocking the data communication further based on a monitoring profile associated with the first computing device.

22. The apparatus of claim 16, wherein the apparatus comprises a gateway device,
wherein the first computing device comprises a voice assistant device, and
wherein the instructions, when executed by the one or more processors, cause the gateway device to receive the first indication by:
receiving the first indication from a remote control.

23. The apparatus of claim 16, wherein the instructions, when executed by the one or more processors, further cause the apparatus to:
receive a third indication that a second trigger event, associated with a second audio for the first computing device, has occurred;
after the second trigger event has occurred, receive a fourth indication that a second communication window associated with the second audio is open;
receive a second data communication associated with the first computing device; and route, based on the fourth indication that the second communication window associated with the second audio is open, the second data communication.

24. An apparatus comprising:
one or more processors; and
memory storing instructions, that when executed by the one or more processors, cause the apparatus to:
receive a first indication that a trigger event, associated with audio for a first computing device, has occurred;
after the trigger event has occurred, receive a second indication that a communication window associated with the audio is open;
receive a data communication associated with the first computing device; and
route, based on the second indication that the communication window associated with the audio is open, the data communication.

25. The apparatus of claim 24, wherein the instructions, when executed by the one or more processors, cause the apparatus to receive the first indication by:
receiving the first indication from a second computing device that detected the trigger event.

26. The apparatus of claim 24, wherein the instructions, when executed by the one or more processors, cause the apparatus to receive the data communication by:
receiving the data communication from the first computing device.

27. The apparatus of claim 24, wherein the instructions, when executed by the one or more processors, cause the apparatus to route the data communication by at least one of:
forwarding the data communication to a network outside a premises associated with the apparatus, or
causing an intended destination device to receive the data communication.

28. The apparatus of claim 24, wherein the instructions, when executed by the one or more processors, further cause the apparatus to:
send a monitoring parameter to a second computing device to cause the second computing device to monitor the first computing device for the trigger event.

29. The apparatus of claim 24, wherein the apparatus comprises a gateway device,
wherein the first computing device comprises a voice assistant device, and
wherein the instructions, when executed by the one or more processors, cause the gateway device to receive the first indication by:
receiving the first indication from a remote control.

30. The apparatus of claim 24, wherein the instructions, when executed by the one or more processors, cause the apparatus to route the data communication by:
routing the data communication further based on a monitoring profile associated with the first computing device.

* * * * *

UNITED STATES PATENT AND TRADEMARK OFFICE
CERTIFICATE OF CORRECTION

| | |
|---|---|
| PATENT NO. | : 11,211,054 B2 |
| APPLICATION NO. | : 16/986945 |
| DATED | : December 28, 2021 |
| INVENTOR(S) | : Patel et al. |

It is certified that error appears in the above-identified patent and that said Letters Patent is hereby corrected as shown below:

In the Specification

Column 6, Detailed Description, Line 7:
Delete "Ski" and insert --Siri-- therefor Column 8, Detailed Description, Line 5:
Delete "305" and insert --307-- therefor Column 16, Detailed Description, Line 35:
After "503", insert --is--

Column 17, Detailed Description, Line 12:
Delete "50" and insert --505-- therefor Column 18, Detailed Description, Line 11:
Delete "949" and insert --549-- therefor Column 18, Detailed Description, Line 43:
Delete "911." and insert --511.-- therefor Column 18, Detailed Description, Line 47:
Delete "911." and insert --511.-- therefor Column 19, Detailed Description, Line 37:
Delete "903." and insert --503.-- therefor Column 19, Detailed Description, Line 41:
Delete "903." and insert --503.-- therefor Signed and Sealed this
Thirtieth Day of May, 2023

Katherine Kelly Vidal
*Director of the United States Patent and Trademark Office*

Column 20, Detailed Description, Line 28:
Delete "parameters);" and insert --parameters;-- therefor